United States Patent
Najafi et al.

(10) Patent No.: US 9,778,039 B2
(45) Date of Patent: Oct. 3, 2017

(54) MICROSYSTEM DEVICE AND METHODS FOR FABRICATING THE SAME

(71) Applicant: The Regents of the University of Michigan, Ann Arbor, MI (US)

(72) Inventors: Khalil Najafi, Ann Arbor, MI (US); Rebecca L. Peterson, Ann Arbor, MI (US); Jae Yoong Cho, Ann Arbor, MI (US); Zongliang Cao, Ann Arbor, MI (US); Guohong He, Ann Arbor, MI (US); Jeffrey Gregory, Burlington, MA (US); Yi Yuan, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 13/665,163

(22) Filed: Oct. 31, 2012

(65) Prior Publication Data
US 2013/0105921 A1    May 2, 2013

Related U.S. Application Data

(60) Provisional application No. 61/553,512, filed on Oct. 31, 2011.

(51) Int. Cl.
   *G01C 19/5769* (2012.01)
   *G01C 19/5712* (2012.01)
   (Continued)

(52) U.S. Cl.
   CPC ....... *G01C 19/5769* (2013.01); *G01C 19/574* (2013.01); *G01C 19/5712* (2013.01);
   (Continued)

(58) Field of Classification Search
   CPC ........... H01L 21/2633; H01L 21/76897; H01L 24/94; H01L 25/50; H01L 31/1876;
   (Continued)

(56) References Cited

U.S. PATENT DOCUMENTS

| 4,125,017 A | 11/1978 | Dhuyvetter et al. |
| 6,725,719 B2 | 4/2004 | Cardarelli |

(Continued)

OTHER PUBLICATIONS

Alexandr Agreev et. al., "Very high quality factor measured in annealed fused silica", *Classical and Quantum Gravity*, v. 21, n. 16, pp. 3887-3892, 2004, http://arxiv.org/abs/gr-qc/0403105v1.

(Continued)

*Primary Examiner* — Steven Loke
*Assistant Examiner* — Juanita Rhodes
(74) *Attorney, Agent, or Firm* — Dierker & Kavanaugh, P.C.

(57) ABSTRACT

A microsystem includes a base layer formed from an electrical insulating material. The base layer has an inner surface defining a cavity and an external surface opposed to the inner surface, and in direct communication with an environment. A cap layer and a microelectromechanical (MEMS) device layer are formed from electrical insulating material or an other electrical insulating material. The cap has an inner surface defining a cavity, and an external surface opposed to the inner surface, and in direct communication with the environment. A MEMS device on/in the MEMS device layer is disposed between the base and the cap. Respective adjacent portions of the base, the cap and the device substrate are bonded to define an enclosed space. The enclosed space at least partially includes the base cavity or the cap cavity. At least a portion of a MEMS device on the device layer is in the enclosed space.

31 Claims, 32 Drawing Sheets

(51) Int. Cl.
    G01C 19/574    (2012.01)
    G01P 15/08     (2006.01)
    G01P 15/097    (2006.01)
    G01P 15/125    (2006.01)
(52) U.S. Cl.
    CPC ........ *G01P 15/0802* (2013.01); *G01P 15/097* (2013.01); *G01P 15/125* (2013.01)
(58) Field of Classification Search
    CPC ............ G01C 19/5769; G01C 19/5712; G01C 19/574; G01P 15/0802; G01P 15/097; G01P 15/125
    See application file for complete search history.

(56) References Cited

U.S. PATENT DOCUMENTS

| | | | | |
|---|---|---|---|---|
| 2002/0113191 | A1* | 8/2002 | Rolt | B81B 7/0012 248/550 |
| 2004/0227201 | A1* | 11/2004 | Borwick, III | B81C 1/00238 257/414 |
| 2006/0067617 | A1* | 3/2006 | Gaylord | G02B 6/02085 385/37 |
| 2007/0046304 | A1* | 3/2007 | Mok | G01R 1/07342 324/750.05 |
| 2008/0282802 | A1* | 11/2008 | Pike | G01P 15/08 73/514.32 |
| 2009/0056121 | A1* | 3/2009 | Sasaki | H01L 24/24 29/854 |
| 2009/0085191 | A1* | 4/2009 | Najafi | B81B 7/0058 257/698 |
| 2009/0212407 | A1* | 8/2009 | Foster | B81B 7/0006 257/686 |
| 2010/0109102 | A1* | 5/2010 | Chen | B81C 1/00238 257/417 |
| 2010/0244161 | A1* | 9/2010 | Tabrizi | H01L 23/055 257/415 |
| 2010/0290199 | A1* | 11/2010 | Schmid | B81C 1/0023 361/752 |
| 2012/0032283 | A1* | 2/2012 | Frey | G01P 15/0802 257/415 |
| 2012/0142144 | A1* | 6/2012 | Taheri | B81B 7/007 438/107 |
| 2012/0300969 | A1* | 11/2012 | Tanaka | H04R 19/005 381/355 |

OTHER PUBLICATIONS

F. Ayazi and K. Najafi, "High Aspect-Ration Combined Poly and Single-Crystal Silicon (HARPSS) MEMS Technology" *J. Micro Electro Mechanical Systems*, v. 9, n. 3, p. 288-294, Sep. 2000.
I.A. Bilenko, V.B. Braginsky, S.L. Lourie, S.L., "Mechanical losses in thin fused silica fibres", *Classical and Quantum Gravity*, v 21, n. 5, p. S1231-5, 2004.
Braman, T and Grossman, O, "Designing vibration and shock isolation systems for micro electrical machined based inertial measurement units" *Proc. IEEE/ION Position, Location, and Navigation Symposium (PLANS)*, 2006, pp. 400-404.
E. Cesarini et. al., "Mechanical characterization of 'uncoated' and 'Ta2O5- single-layer-coated' SiO2 substrates: results from GeNS suspension, and the CoaCh project", *Classical and Quantum Gravity*, v. 27, n. 8, Apr. 2010. pp. 1-10.
J. Chae, H. Kulah, and K. Najafi, "An In-Plane High-Sensitivity, Low-Noise Micro-g Silicon Accelerometer with CMOS Readout Circuitry," *IEEE/ASME Journal of Microelectromechanical Systems (JMEMS)*, vol. 13, No. 4, pp. 628-635, Aug. 2004.
M.J. Dalal et. al., "Simultaneous Dual-mode Excitation of Piezo-on-Silicon Micromechanical Oscillator for Self-temperature Sensing," *IEEE MEMS Conference*, Jan. 2011.
R. Dean, "Micromachined vibration isolation filters to enhance packaging for mechanically harsh environments", *J. Microelectron. Electron. Packag.* vol. 2, 2005, pp. 223-231.
R.L. Filler, "The Acceleration Sensitivity of Quartz Crystal Oscillators: A Review," *IEEE Transactions on Ultrasonics, Ferroelectrics, and Frequency Control*, May 1988.
F. Frost, R. Fechner, B. Ziberi, J. Vollner, D. Flamm and A. Schindler, "Large area smoothing of surfaces by ion bombardment: fundamentals and applications," *J. Physics: Condensed Matter*, v. 21, n. 22, p. 224026, 2009.
S. Habibi et al, "Gun Hard Inertial Measurement Unit Based on MEMS capacitive accelerometer and rate sensor," IEEE PLAN Symp., May 2008.
M.L. Hammond et. al. "Influence of Environment on Brittle Fracture of Silica", *Journal of the American Ceramic Society*, vol. 46, No. 7, pp. 329-332, Jul. 1963.
S.-H. Lee et. al., "A low-power oven-controlled vacuum package technology for high-performance MEMS", *Proceedings from MEMS09 Sorrento*, 2009.
G.K. Ho, J.K. Perng, F. Ayazi, "Micromechanical IBARs: Modeling and Process Compensation," Journal of Microelectromechanical Systems, vol. 19, No. 3, pp. 516-525, Jun. 2010.
Y-S Hwang et. al. , "Fabrication of Electrostatically-Actuated, In-Plane Fused Quartz Resonators using Silicon-on-Quartz (SoQ) Bonding and Quartz DRIE", *MEMS* 2009.
Hwangbo, et al. "Factorization-Based Calibration Method for MEMS Inertial Measurement Unit", *IEEE Int'l Conf on Robotics and Automation (ICRA )*, May 2008, pp. 1306-1311.
V. Kaajakari, J.K. Koskinen, T. Mattila, "Phase noise in capacitively coupled micromechanical oscillators," IEEE Transactions on Ultrasonics, Ferroelectrics and Frequency Control, vol. 52, No. 12, pp. 2322-2331, Dec. 2005.
R. N. Candler, et al, "Single wafer encapsulation of MEMS Devices," *IEEE Trans. Adv. Packaging*, v. 26, n. 3, Aug. 2003.
Lee, S H, Lee, S W and Najafi, K, "A generic environment-resistant packaging technology for MEMS," *Proc. Int. Solid-State Sensors, Actuators and Microsystems Conf. (TRANSDUCERS)* (Lyon, France), 2007, pp. 335-338.
J.C. Salvia et. al., "Real-Time emperature Compensation of MEMS Oscillators Using an Integrated Micro-Oven and a Phase-Locked Loop," *Journal of Microelectromechanical Systems*, vol. 19, No. 1, pp. 192-201, Feb. 2010.
J. Vig, "Introduction to Quartz Frequency Standards", available at IEEE-UFFC website at http://www.ieee-uffc.org/frequency_control/teaching.asp?name=vigtoc.
N. Yazdi, A. Mason, K. Najafi, and K.D. Wise, "A Generic Interface Chip for Capacitive Sensors in Low-Power Multi-Parameter Microsystems," *Sensors & Actuators, A: Physical*, 84 (3) pp. 351-356.

* cited by examiner

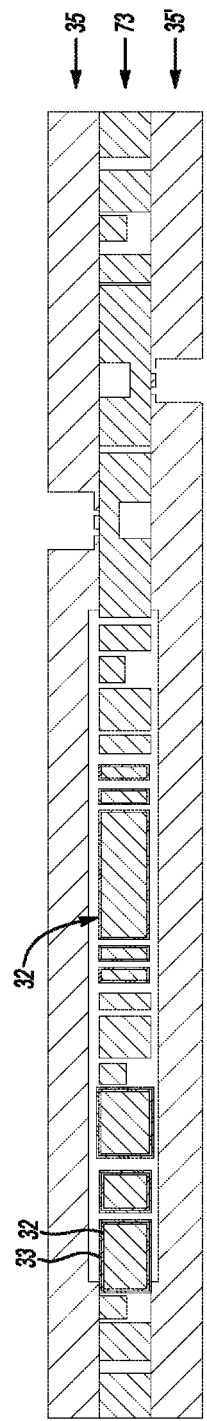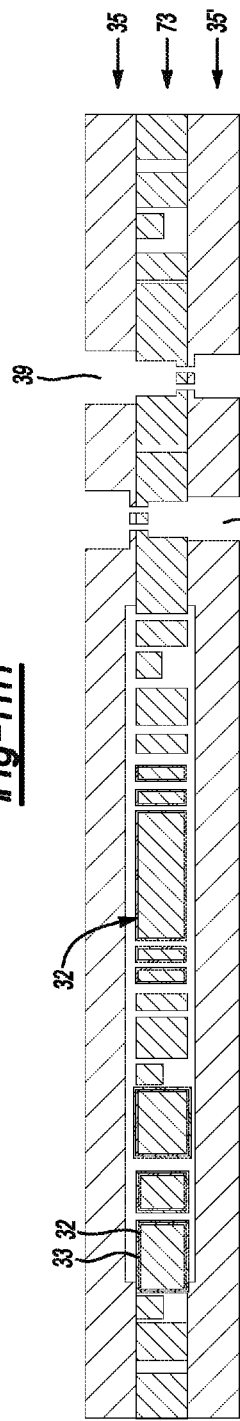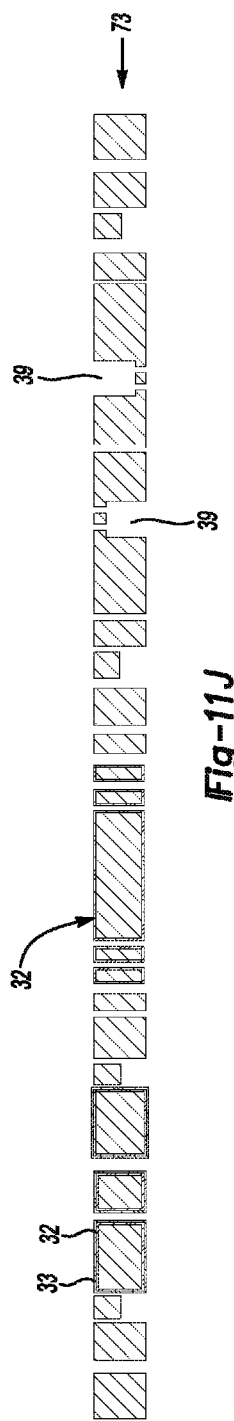

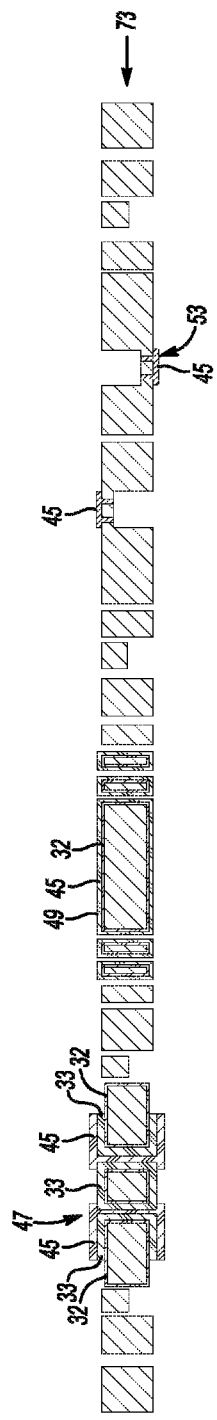
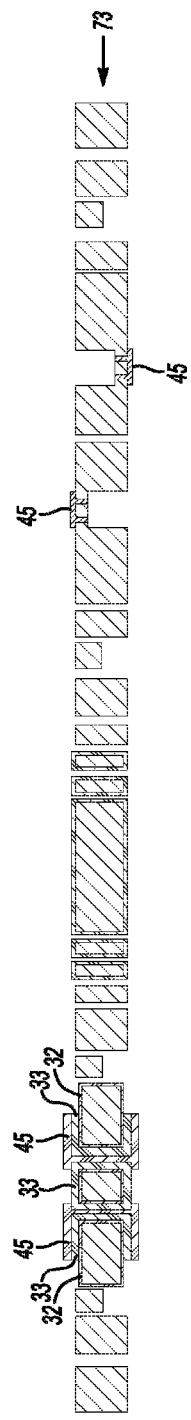
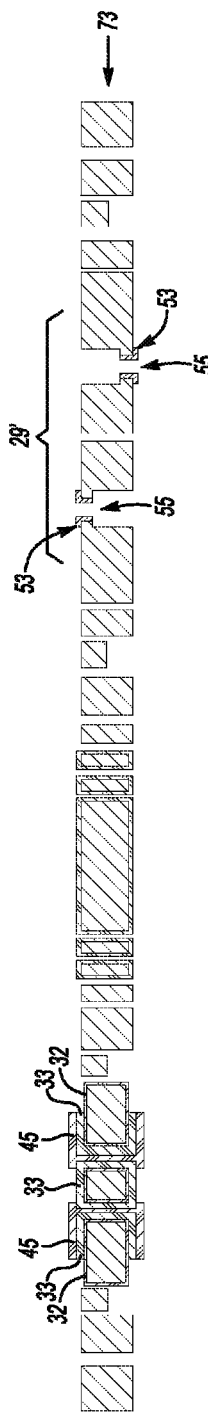

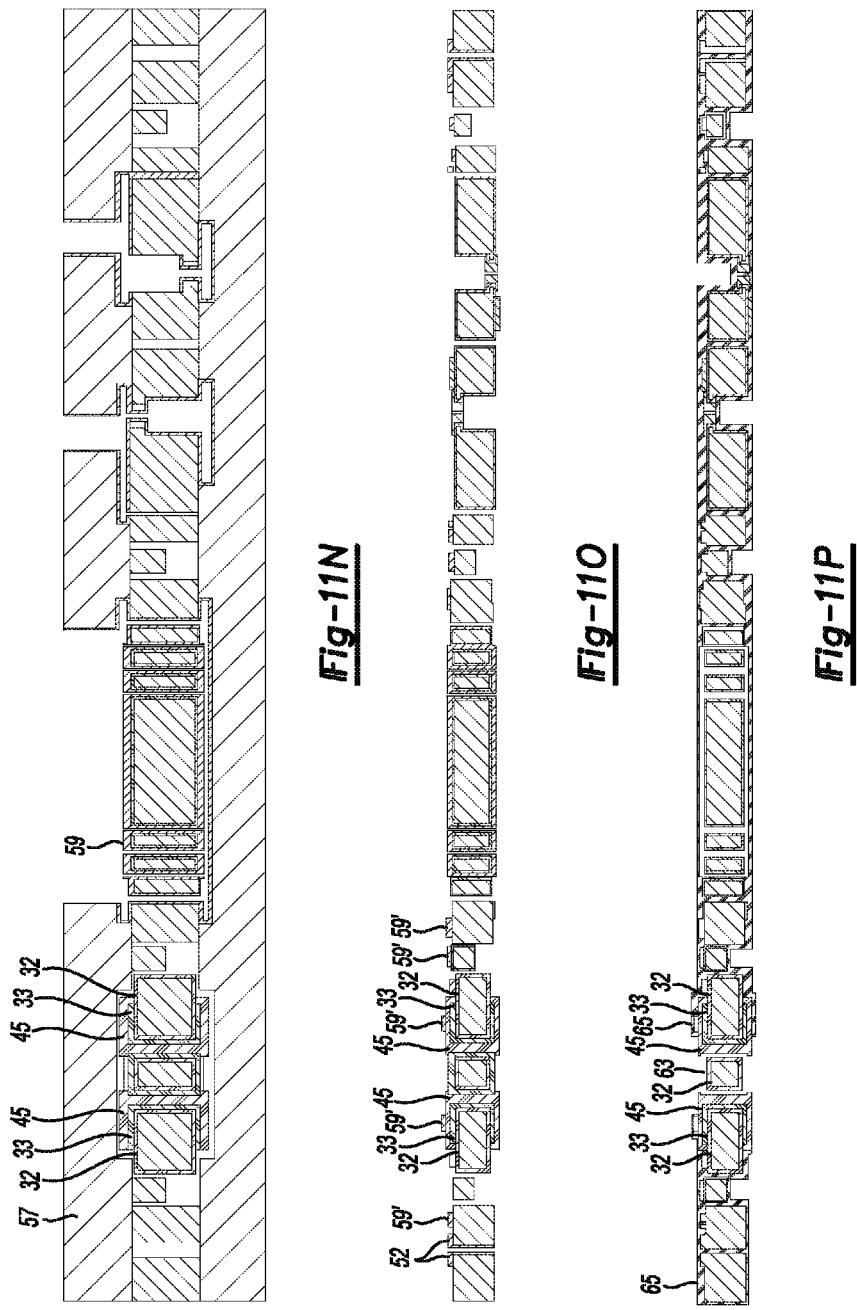

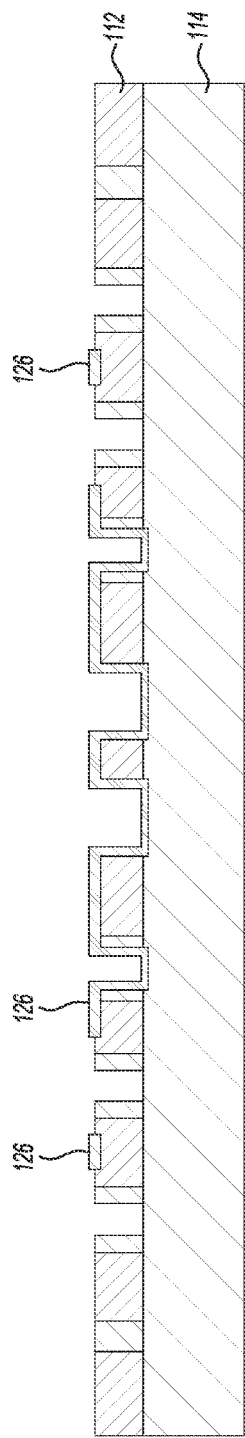
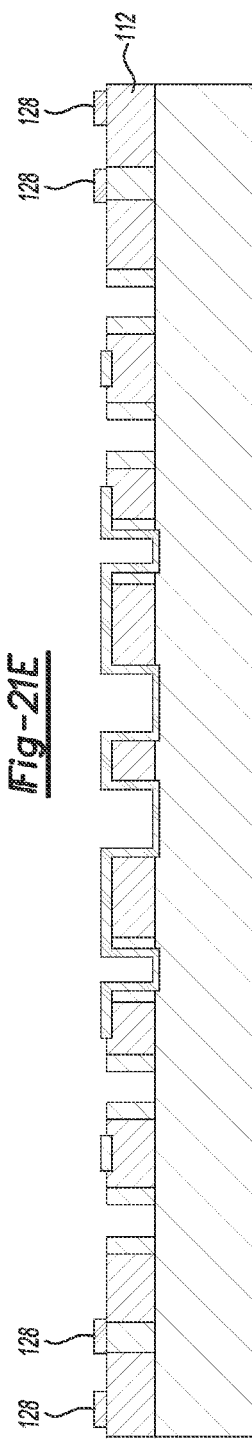
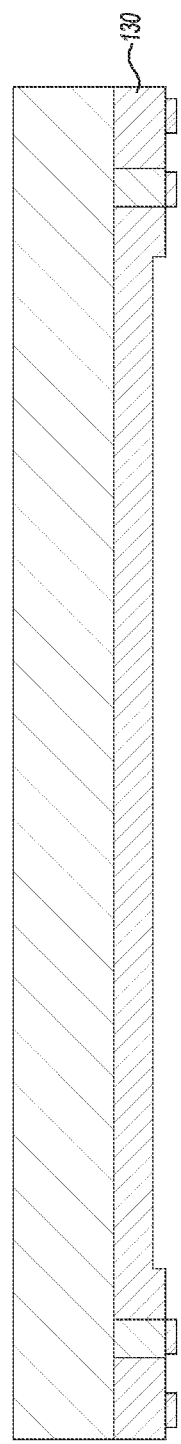
Fig-21E
Fig-21F
Fig-21G

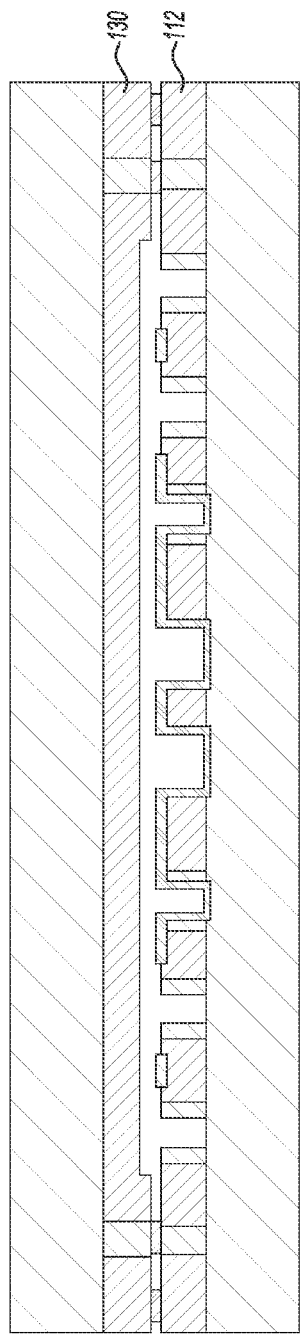
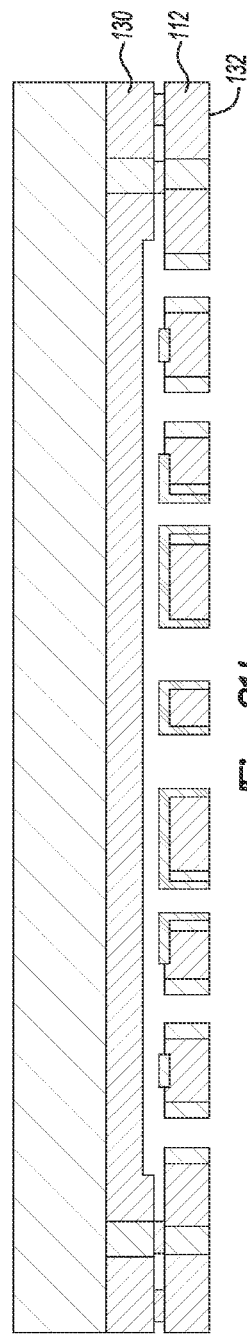
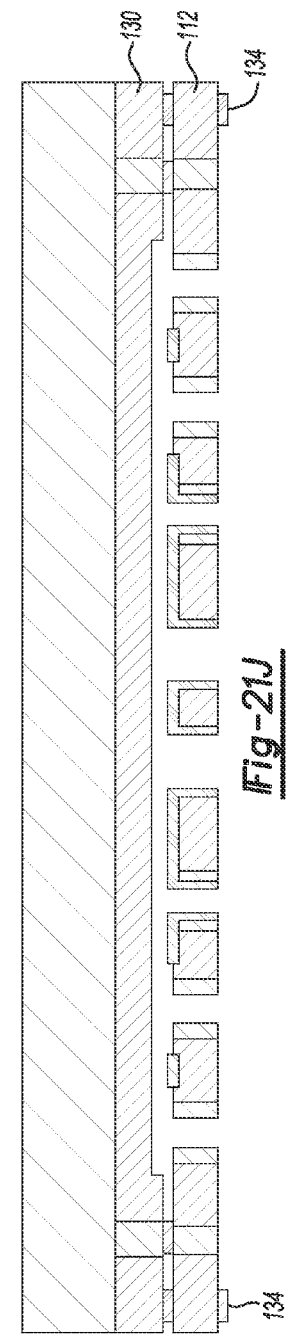
Fig-21H
Fig-21I
Fig-21J

MICROSYSTEM DEVICE AND METHODS FOR FABRICATING THE SAME

CROSS-REFERENCE TO RELATED APPLICATIONS

This application claims the benefit of U.S. Provisional Application Ser. No. 61/553,512, filed Oct. 31, 2011, which is incorporated by reference herein in its entirety.

STATEMENT REGARDING FEDERALLY SPONSORED RESEARCH OR DEVELOPMENT

This invention was made with government support under Grant No. N66001-11-C-4170 awarded by the Defense Advanced Research Projects Agency (DARPA). The government has certain rights in the invention.

BACKGROUND

Some examples of applied MEMS include inertial sensors, accelerometers, miniature robots, microengines, locks, micro actuators, optical scanners, fluid pumps, transducers, and chemical, pressure and flow sensors.

MEMS timing and inertial measurement units (TIMUs) are devices used to measure inertial effects and time with a wide range of applications. For example, TIMUs may be used in determining speed, acceleration, and direction, thereby having applications in navigation. MEMS TIMUs can perform the functions of angular rate sensors (gyroscopes), accelerometers, and mechanical oscillators for timers and filters. While discrete sensor and timing units have been successful, integration of several such devices in a single integrated MEMS structure has been met with drawbacks.

For example, silicon structures for timing and inertial measurement devices, including micromachined resonant accelerometers, gyroscopes, capacitive accelerometers and micromechanical resonators for timing units have been tried and tested. In some cases, the conductive properties of silicon have required application scientists to take additional steps to insulate conductors disposed on a silicon substrate.

Some of the drawbacks encountered in previous attempts at integrating a TIMU in a single MEMS structure have been: large size, coupling between devices and the conflicting process and package requirements for accelerometers, gyroscopes, and timing units. System integration is a particular challenge, including the incorporation of temperature control, vibration/shock isolation and sensor fusion.

BRIEF DESCRIPTION OF THE DRAWINGS

Features and advantages of examples of the claimed subject matter will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

The present disclosure relates generally to micro-electromechanical systems (MEMS).

Figure 1:
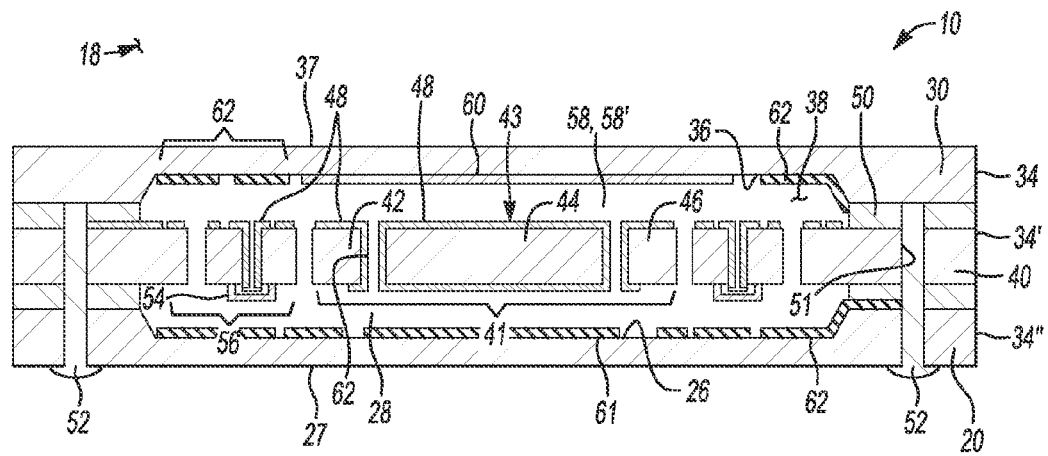
FIG. 1 is a semi-schematic cross-sectional view of an example of a microsystem as disclosed herein.

FIG. 1 is a cross sectional view of an example of a microsystem 10 as disclosed herein. A MEMS device layer 40 is shown disposed between a package base layer 20 and a cap layer 30. The package base layer 20 is formed from a first substrate of an electrical insulating material.

In examples of the present disclosure, the electrical insulating material may include fused silica, fused quartz, glass, ceramic, zero expansion glass-ceramic, ultra low expansion (ULE®) glass, Zerodur®, Pyrex®, Borofloat®, Clearceram®, mica, alumina, sapphire, or quartz. Fused silica is a type of glass that is mainly silica in a non-crystalline form. An example of fused silica is Corning 7980 0F UV grade commercially available from Valley Design Corporation, Santa Cruz, Calif. Fused silica wafers are commercially available in many diameters and thicknesses. For example, a Valley Design Corporation part number FS-105 is 200 mm in diameter×0.5 mm thick, and part number FS-148 is 100 mm in diameter×2.3 mm thick. Fused silica may be micromachined using a variety of dry and wet etching techniques, or fused silica may be molded into a particular shape.

Still referring to FIG. 1, the package base layer 20 has a base inner surface 26 defining a base cavity 28. A base external surface 27 is opposed to the base inner surface 26 and in direct communication with an environment 18. A cap layer 30 is formed from a second substrate of the electrical insulating material or another electrical insulating material. The cap layer 30 has a cap inner surface 36 defining a cap cavity 38. A cap external surface 37 is opposed to the cap inner surface 36, and is in direct communication with the environment 18.

The MEMS device layer 40 is disposed between the package base layer 20 and the cap layer 30. The MEMS device layer 40 is formed from a device layer substrate. The MEMS device layer substrate may be a substrate of the electrical insulating material from which the package base layer 20 or the cap layer 30 is formed or a substrate of another electrical insulating material. It is to be understood that any number and combination of electrical insulating materials may be used to form electrical insulating materials. In a non-limiting example, the package base layer may be a first electrical insulating material, the MEMS device layer substrate may be a second electrical insulating material, and the cap may be formed from a third electrical insulating material. In another example, the package base layer substrate and the cap layer may be formed from the first electrical insulating material, and the MEMS layer substrate may be formed from a second electrical insulating material. Selection from first, second, third, etc. electrical insulating material for each substrate may be independent.

In examples of the present disclosure, the microsystem 10 may include more than one MEMS device layer 40. In an example, a MEMS device layer 40 may include or be formed from a substrate of an electrical insulating material, and another MEMS device layer 40' (see FIG. 4) may include or be formed from a substrate chosen from, e.g., silicon, silicon-on-insulator, silicon dioxide, germanium, silicon carbide, silicon carbon, graphite, graphene, gallium arsenide, gallium nitride, gallium phosphide, indium phosphide, zinc oxide, zinc sulfide, zinc selenide, lead zirconium titanate, cadmium selenide, cadmium telluride, cadmium mercury telluride, lithium niobate, lithium tantalite, yttrium aluminum garnet (YAG), magnesium oxide, magnesium fluoride, lithium fluoride, barium fluoride, barium titanate, strontium titanate, metals, or combinations thereof. In such an example, the other MEMS device layer 40' is not necessarily (but may be) formed on/from an insulating substrate. It is to be understood that combinations as used herein may include any combination in or on the MEMS layer including alloys of metals, mixtures of materials, layers of materials, and dispersions of materials.

In examples of the present disclosure, at least a portion of the MEMS device layer may be unsupported by the MEMS device layer substrate. A portion of the substrate may be removed during fabrication, thereby leaving the unsupported portion of the MEMS device layer. Furthermore, the MEMS device 43 may be formed in the device layer substrate of the MEMS device layer 40 by micromachining.

In the example of the present disclosure depicted in FIG. 1, respective adjacent portions of the package base layer 20, the cap layer 30 and the MEMS device layer 40 are bonded to define an enclosed space 58 between the package base layer 20 and the cap layer 30. The enclosed space 58 at least partially includes the base cavity 28 or the cap cavity 38. In examples of the present disclosure, the respective adjacent portions of the package base layer 20, the cap layer 30, and the MEMS device layer 40 may be respective adjacent edges of the package base layer 20, the cap layer 30, and the MEMS device layer 40. At least an operative portion of the MEMS device 43 is disposed in the enclosed space 58. As used herein, an enclosed space means a volume that is substantially surrounded by a barrier. In some examples, the enclosed space 58 may be a sealed space 58' that has substantially no flow of material in or out of the sealed space 58'. In other examples, fluid communication may be possible between the enclosed space 58 and the ambient space external to the enclosed space 58. For example, an atmospheric pressure sensor (not shown) may be disposed inside the enclosed space 58. In the example, a port (not shown) may be disposed in the MEMS device layer 40, the package base layer 20 and/or the cap layer 30 to allow the atmospheric air to be in fluid communication with the pressure sensor.

In the example depicted in FIG. 1, a low thermal coefficient of expansion (TCE) glass frit 50 is used to bond the package base layer 20, the cap layer 30 and the MEMS device layer 40. It is to be understood that other bonding techniques are disclosed herein. For example, solders (i.e., eutectic solders) and other conductors may be used as bonding materials.

In examples of the present disclosure, the MEMS device 43 is chosen from sensors, actuators, mechanical isolators, thermal isolators, shock absorbers, and combinations thereof. It is to be understood that there may be one or more than one MEMS device 43 in a single MEMS device layer 40.

A feedthrough via 51 may be formed in respective adjacent portions of the package base layer 20, cap layer 30, and the MEMS device layer 40. For example, the vias may be disposed in respective adjacent edges 34, 34', and 34" of the cap layer 30, the MEMS device layer substrate 40, and the package base layer 20 respectively. An electrically conductive feedthrough 52 may be disposed in the via 51 to allow electrical communication through the electrical insulating material with the MEMS device 43 in the sealed space 58'. In examples of the disclosed microsystem 10 having feedthroughs 52 passing through an electrical insulator material, the feedthroughs 52 are naturally isolated from one another. Connections to the feedthroughs 52 are made using conductors 62 deposited on the package base layer 20, cap layer 30, and/or the MEMS device layer 40 and brought out to the edge 34, 34' 34" where they are connected to the feedthroughs 52. A conductor 62 or operative material may be deposited on the package base layer 20, the cap layer 30, and/or the MEMS device layer substrate to functionalize the MEMS devices 43 for sensors, actuators, and/or other operative portions of the microsystem 10. An operative material may be deposited on at least a portion of the base inner surface 26, the cap inner surface 36, or combinations thereof to form an electrode, a getter 60, a shock stop 61, or to operatively perform as a portion of a sensor, actuator, and/or other operative portion of the microsystem 10. It is to be understood that a getter 60 may maintain a vacuum in an evacuated sealed space 58' by chemically reacting with or adsorbing gas molecules.

As used herein, an operative material performs an electronic, photonic, chemical, magnetic, or thermal function. Examples of operative materials as disclosed herein may have the following non-limitative characteristics: conducting, insulating, semiconducting, piezoresistive, piezoelectric, thermoelectric, fluorescent, phosphorescent, chemiluminescent, pyroelectric, magnetoelastic, magnetostrictive, ferroelectric, and/or magnetic, etc.

FIG. 1 depicts an integrated sensor 41 formed, for example, by micromachining the MEMS device layer substrate. The integrated sensor 41 may include, for example, a drive 42, a mass 44, and a transducer 46. An operative material 48 may be deposited on portions of the MEMS device layer substrate to form device elements including electrodes, capacitors, resistors, inductors and connector traces. In the example depicted in FIG. 1, atomic layer deposition (ALD) may be used to deposit tungsten as indicated on the surfaces at reference numeral 48. A 3-axis vibration/thermal isolation platform 56 having a vertical spring 54 (e.g. formed from poly-silicon) is depicted. It is to be understood that in this cross-sectional view, thin support whiskers attaching various components are not shown by drawing convention. However, it is to be further understood that some examples of the disclosed microsystem 10 may include a mass 44 that is held in place by electric or magnetic fields without a mechanical connection to adjacent parts.

Figure 2:
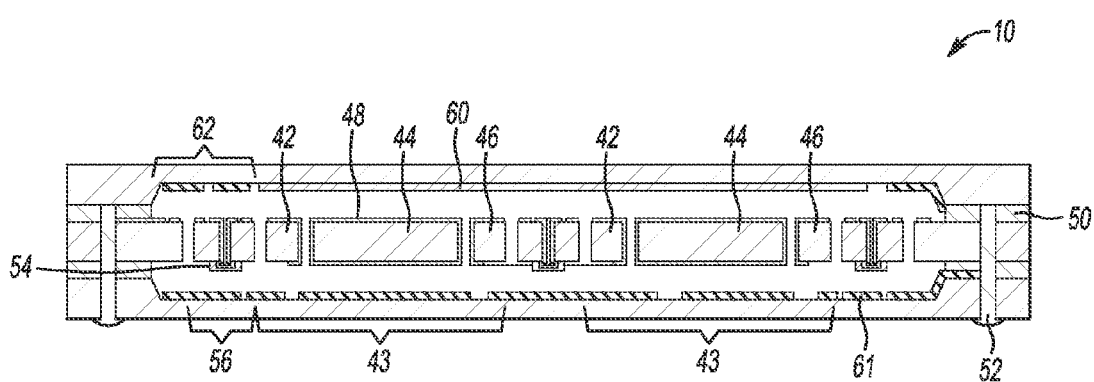
FIG. 2 is a semi-schematic cross-sectional view of an example with multiple devices on a single layer according to the present disclosure.
Figure 3:
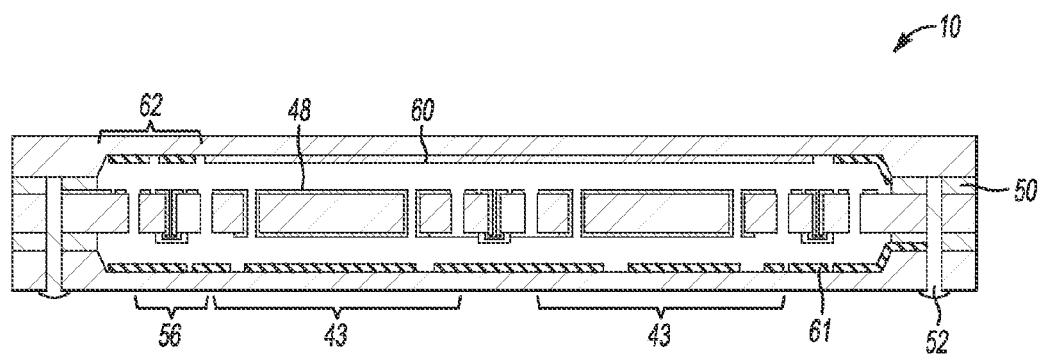
FIG. 3 is another semi-schematic cross-sectional view of the example depicted in FIG. 2.

FIGS. 2 and 3 depict examples of the disclosed microsystem in which a single MEMS device layer 40 may support either one MEMS device 43, or a plurality of MEMS devices 43 chosen from sensors, actuators, mechanical isolators and thermal isolators and shock absorbers.

Figure 4:
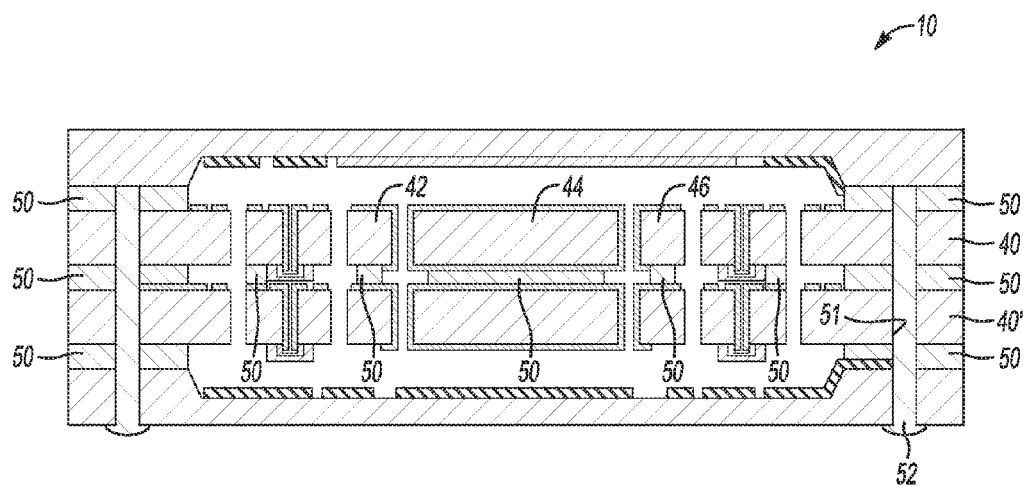
FIG. 4 is a semi-schematic cross-sectional view of an example with two MEMS device layers according to the present disclosure.

Referring to FIG. 4, examples of the microsystem 10 disclosed herein may include two MEMS device layers 40, 40'. As depicted in FIG. 4, at least a portion of one of the two MEMS device layers 40 may be mechanically connected to at least a portion of the other of the two device layers 40'. The mechanical connection may be made by bonding the portions (e.g., using a glass frit 50 or other bonding material including solder or other metals), or by creating a mechanical linkage using gears, levers, latches, interlocks, springs, electrostatic fields, magnetic fields or friction surfaces (not shown). In other examples, at least a portion of one of the two MEMS device layers 40 may be mechanically isolated from at least a portion of the other of the two MEMS device layers 40'.

Figure 5:
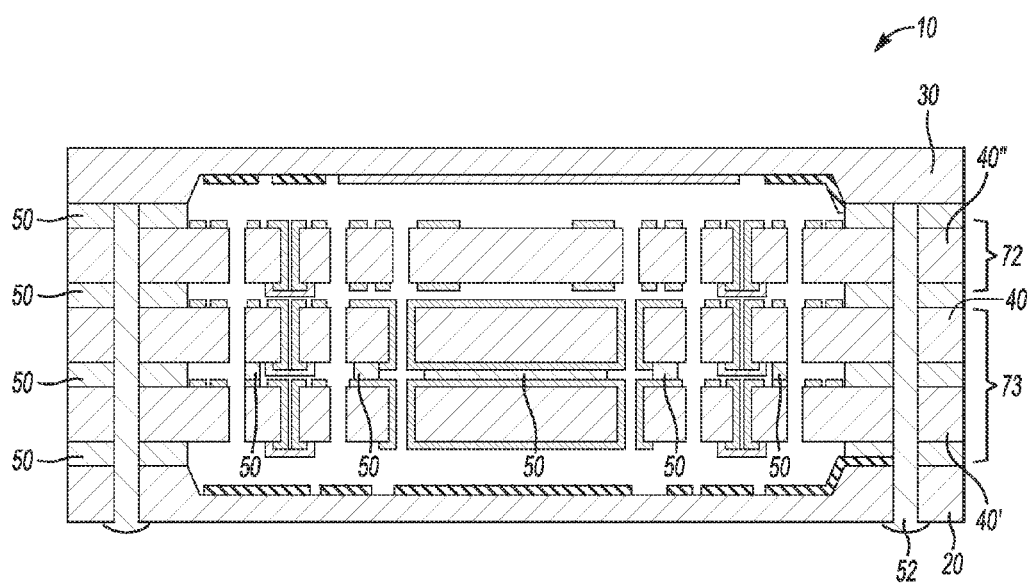
FIG. 5 is a semi-schematic cross-sectional view of an example with 3 MEMS device layers according to the present disclosure.
Figure 6:
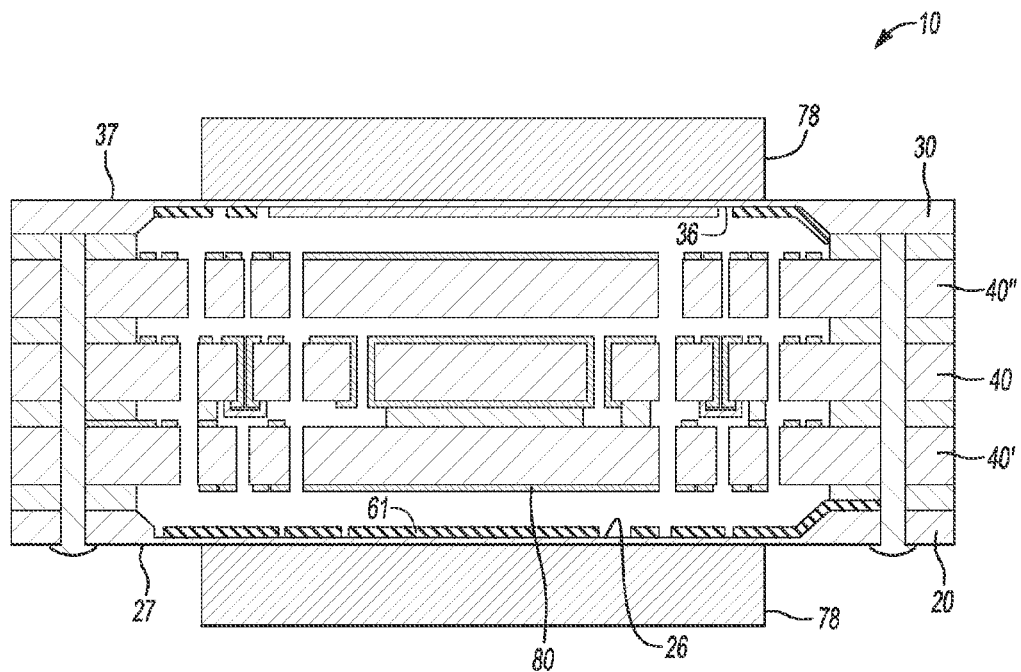
FIG. 6 is a semi-schematic cross-sectional view of an example with 3 MEMS device layers and external masses according to the present disclosure.

FIG. 5 depicts an example of the present disclosure having two MEMS device layers 40, 40' formed from one material (e.g., fused silica) and third MEMS device layer 40" formed from another material (e.g., quartz). In FIG. 6, the two MEMS device layers 40, 40' formed from the one material (depicted at reference numeral 73) are depicted bonded together (i.e. with glass frit 50) and the third MEMS device layer (depicted at reference numeral 72) is mechanically isolated from the two MEMS device layers 73. The package base layer 20 and the cap layer 30 depicted in FIG. 5 are formed from the same electrical insulating material from which the two MEMS device layers 40, 40' are formed (e.g., fused silica), although it is to be understood that the layers 20, 30, 40, 40', 40" may instead each be formed from independently selected different electrical insulating materials.

FIG. 6 depicts an example of the disclosed microsystem 10 in which the cap external surface 37 and the base external surface 27 may be used to form different sensors and actuators. In other words, the package base layer 20 and the cap layer 30 may function as elements of a sensor or actuator in addition to forming a package and enclosing the microsystem 10. In FIG. 6, an external mass 78 is attached to the cap layer 30, and if the cap layer 30 is thin enough, the external mass 78 together with the thin cap layer 30 and the MEMS device layers 40, 40', 40" may form accelerometers, pressure sensors, or force sensors. For example, a conductive surface 80 deposited on the MEMS device layer 40 as shown may cooperate with electrode 61 to form a capacitor. Deflection of the base inner surface 26 from vibration of the external mass 78 may be correlated to a change in capacitance of the capacitor. As such, an example of an accelerometer has been demonstrated. In a variation of this example, a conductive material may be deposited on at least a portion of the base inner surface 26 (as depicted in 61), the cap inner surface 36, (as depicted in 62), the MEMS device layers 40', 40", or combinations thereof to form an inductive element or capacitive plate to electromagnetically communicate with an electromagnetic element (not shown) within or external to the microsystem 10 without direct connection with the electromagnetic element.

Figure 7:
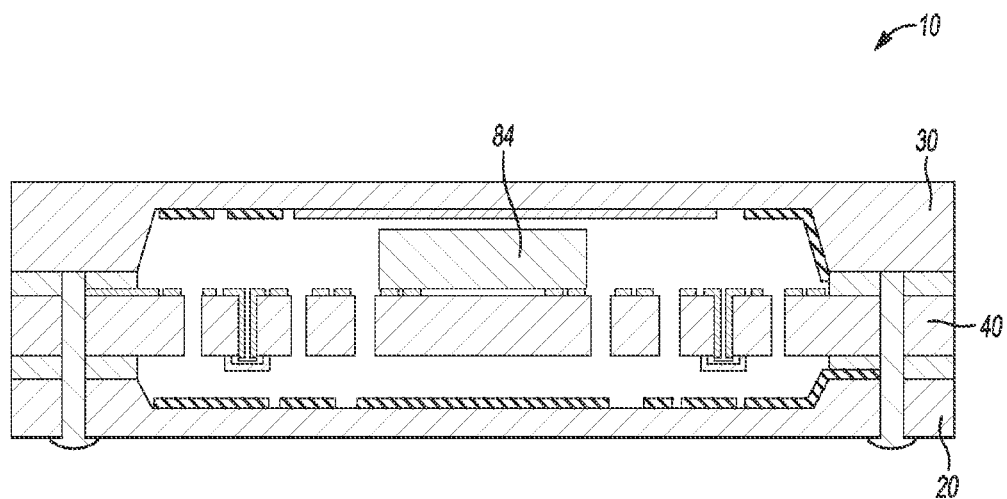
FIG. 7 is a semi-schematic cross-sectional view of an example with a hybrid device according to the present disclosure.

FIG. 7 depicts an example in which an active device 84 is attached to the MEMS device layer 40. In the example, the active device 84, which may be a different technology or material from the MEMS device layer substrate, is flip chip bonded/attached to the MEMS device layer 40. In the example, the MEMS device layer 40 provides an isolation platform for thermal, mechanical, and shock isolation for the flip-chip bonded device. The active device 84 may be monolithically integrated with the MEMS devices layer. For example, diodes and transistors may be co-fabricated during the MEMS device fabrication. In some cases, the active device 84 may not require fabrication from the same material that was used to form the MEMS device layer 40. For example, a silicon active device may be flip-chip bonded to a MEMS device layer 40 made from a fused silica substrate. Active device 84 may similarly be bonded/attached to the package base layer 20, a partition layer (see FIG. 9), the cap layer 30, a MEMS device layer 40 or combinations thereof. It is to be understood that a plurality of active devices 84 may be included in the microsystem 10 using hybrid or monolithic integration.

Figure 8:
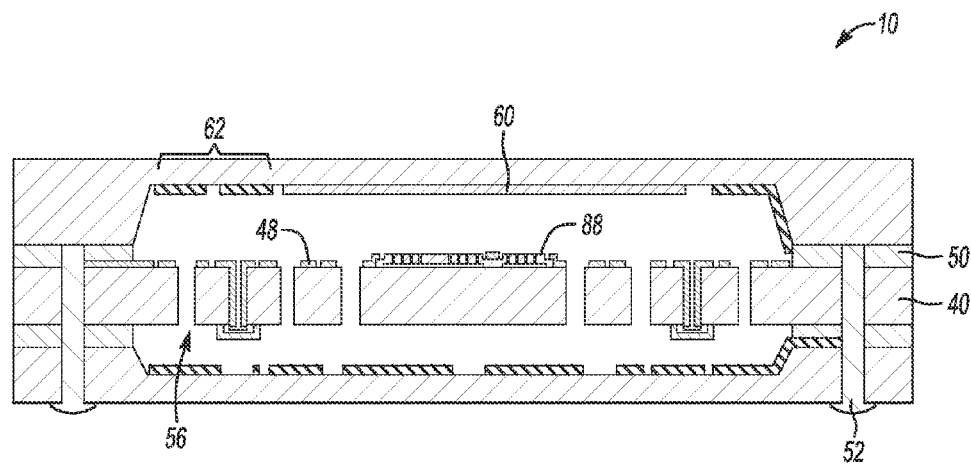
FIG. 8 is a semi-schematic cross-sectional view of an example with a surface micromachined sensor according to the present disclosure.

FIG. 8 depicts an example of a microsystem 10 having integrated devices on the MEMS device layer substrate using a variety of micromachining technologies, including surface micromachining. In an example in which the MEMS device layer substrate is fused silica, many of the same semiconductor fabrication technologies used for silicon devices may be applied. In the example depicted in FIG. 8, a surface micromachined Si device 88 is disposed on an isolation platform 56 formed from the MEMS device layer substrate. The isolation platform 56 may be a thermal and/or mechanical isolation platform.

Figure 9:
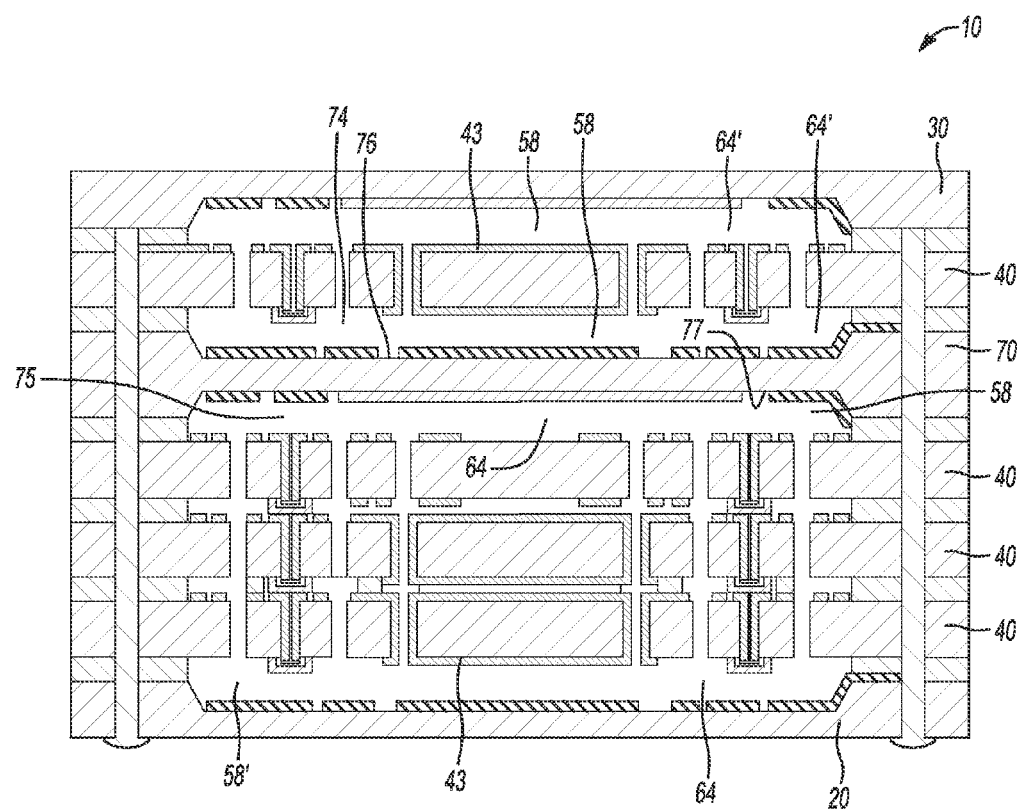
FIG. 9 is a semi-schematic cross-sectional view of an example with a partition layer according to the present disclosure.

FIG. 9 depicts an example of microsystem 10 having a partition layer 70. The partition layer 70 is formed from a third substrate of the electrical insulating material. The partition layer 70 is similar to a combined cap layer 30 and package base layer 20. The partition layer 70 has a first surface 76 defining a first cavity 74 and a second surface 77 opposite the first surface 76 defining a second cavity 75 wherein the partition layer 70 divides the sealed space 58' into at least two hydraulically separated sealed spaces 64, 64'. The at least two hydraulically separated sealed spaces 64, 64' may present particular environments to the MEMS devices 43. For example, one sealed space 64 may be filled with a particular fluid at a particular pressure, and the other sealed space 64' may be substantially evacuated.

Figure 10:
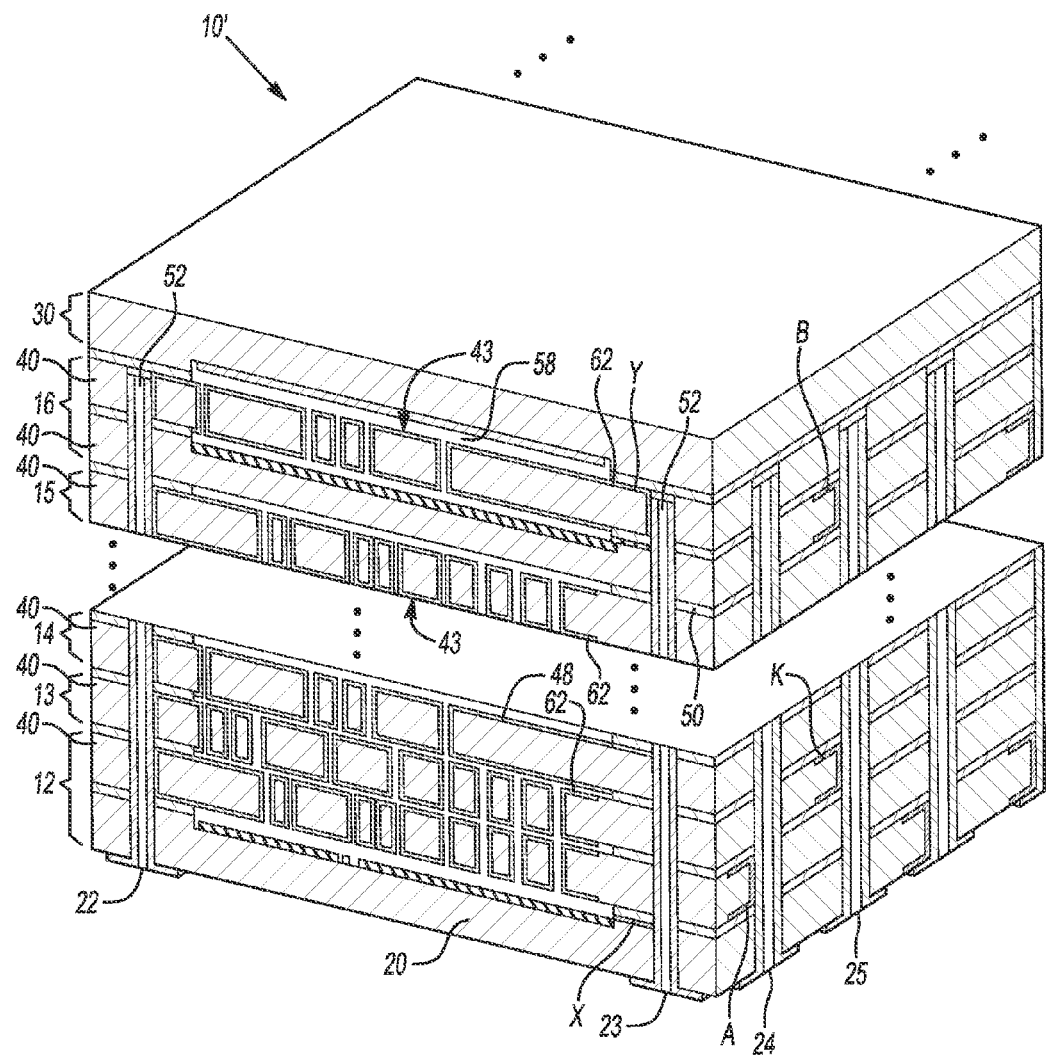
FIG. 10 is a semi-schematic perspective diagram depicting an example of a device according to the present disclosure.

FIG. 10 depicts an example that combines the examples depicted in FIGS. 2-9. A complete microsystem 10' is fabricated, for example, using fused silica layers (wafers) that are bonded together. The microsystem 10' provides an enclosed space 58 for the MEMS devices 43 inside. In examples of the disclosed microsystem, the enclosed space 58 may contain vacuum, air, other gasses or other materials. As depicted in FIG. 10, there may be several MEMS device layers 40 between the package base layer 20 and the cap layer 30. In the example, a first sensor (for sensing in a vertical direction using the orientation shown on the page) is depicted at 12. A second sensor 13 senses in a lateral direction orthogonal to first sensor 12. A third sensor 14 senses in a lateral direction orthogonal to both sensor 12 and sensor 13. At 16, an Nth sensor is depicted to show that any number of MEMS device layers 40 may be included in the microsystem 10'. Adjacent to the Nth sensor 16 is an N−1 sensor 15. In the example depicted in FIG. 10, all of the MEMS device layers 40 are made out of fused silica or a combination of fused silica and other materials.

Sensors, actuators, resonators, and various other mechanical structures may be formed from fused silica, or from layers that are deposited on top of fused silica wafers. Other materials, such as semiconductors, metals and insulators may be deposited on the fused silica wafers to form the MEMS devices 43 or to form feedthroughs 52. Electrical, optical, and fluidic interconnections can be made between cap layer 30, MEMS device layers 40, and package base layer 20 using appropriate feedthroughs 52. Electrical feedthroughs 52 are formed using conductors that pass through either all of the MEMS device layers 40, or through only some of the MEMS device layers 40, and/or through the cap layer 30, and/or through the base layer 20 to transfer signals to the outside world or to interconnect MEMS devices 43 formed on the different MEMS device layers 40. In addition, the MEMS device layers 40 may include conductors 62 which pass through the MEMS device layer to connect the top of the layer to the bottom of the layer, to interconnect devices on the same MEMS device layer 40.

FIG. 10 shows how conductors 62 may be interconnected in the three dimensional (3-D) microsystem 10'. Glass frit 50 may be used to bond and electrically insulate layers and portions of layers. ALD tungsten 48 may be deposited on the layers as electrodes and conductors. For example, the feedthrough with reference numeral 22 may be electrode #1 in the example shown connected as a common bias. Feedthrough 23 may be connected to electrode X from the first sensor 12 and electrode Y from the Nth sensor 16. Feedthrough 24 may be connected to electrode A from the first sensor 12. Feedthrough 25 may be connected to electrode K from the second sensor 13 and electrode B from the Nth sensor 16.

The microsystem 10 disclosed herein may include optically transparent or translucent substrates (e.g., fused silica, glass, and quartz). The MEMS devices 43 or the active devices 84 (see, e.g., FIG. 7) may communicate optically through the package base layer 20, the cap layer 30, the partition layer 70 (see, e.g., FIG. 9) or at least one of the MEMS device layers 40. For example, optical signals encoded with accelerometer output data may be transmitted by a light emitting diode (not shown) through the layers of the microsystem 10. It is to be understood that laser trimming may be accomplished through the optically transparent or translucent substrates (see discussion of FIG. 31 below). For example, resistors (not shown) on the MEMS device layer 40 may be calibrated by laser trimming using a laser source outside of the microsystem 10 even after the microsystem 10 has been sealed.

Where optical communication is used in examples of the microsystem 10 disclosed herein, some or all feedthroughs 52 may be omitted. As such, the package base layer 20, the cap layer 30, the partition layer 70 and the at least one MEMS device layer 40 may be electrically isolated from each other. For example, electrical feedthroughs may be omitted in examples having optical communication. Optical feedthroughs (e.g., light pipes (not shown)) may be used to direct optical signals to and from the MEMS devices 43.

Figure 11A:
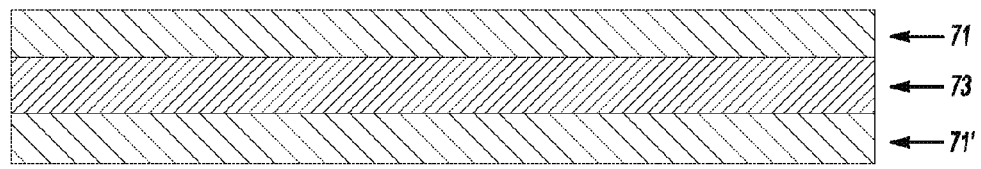
FIGS. 11A-11R are semi-schematic cross-sectional views depicting together an example of a method for forming a microsystem according to the present disclosure.
Figure 11B:
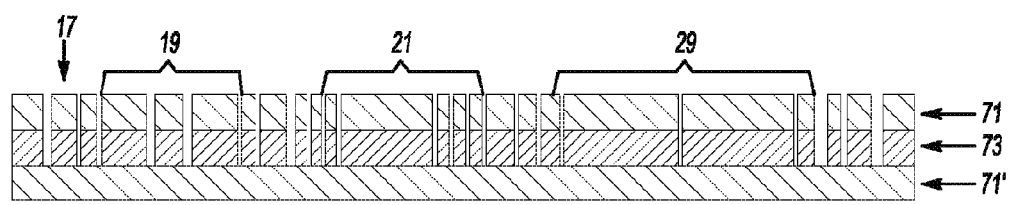
Figure 11C:
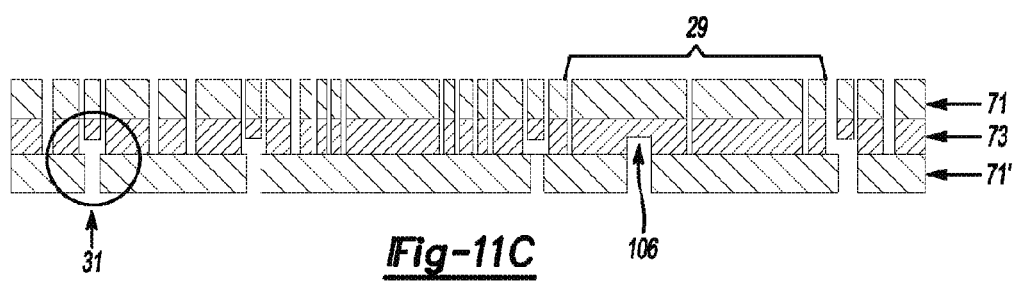
Figure 11D:
Figure 11E:
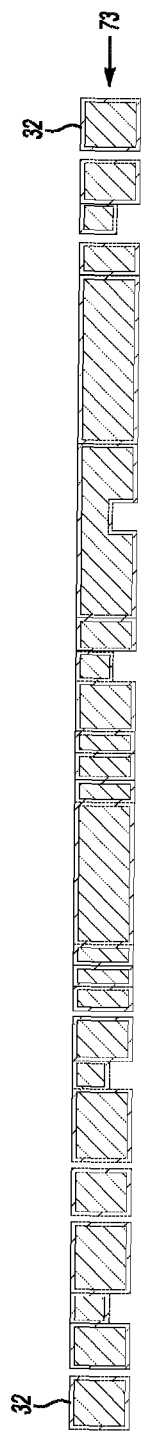
Figure 11F:
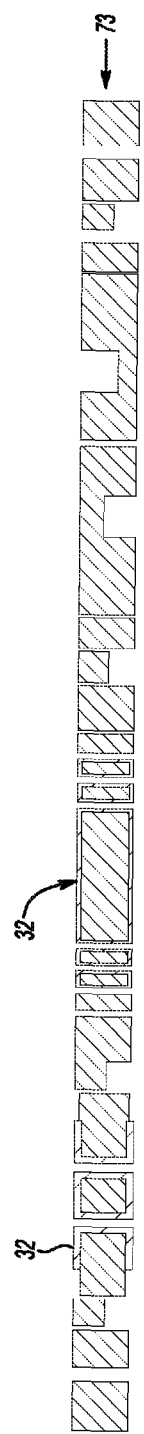
Figure 11G:
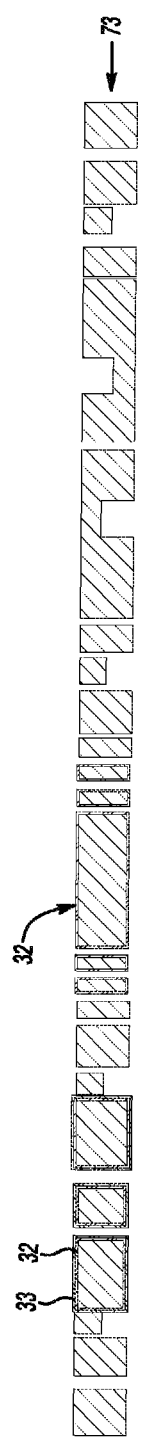
Figure 11Q:
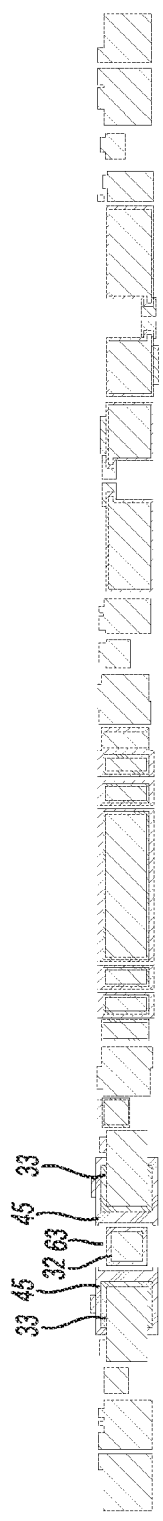
Figure 11R:
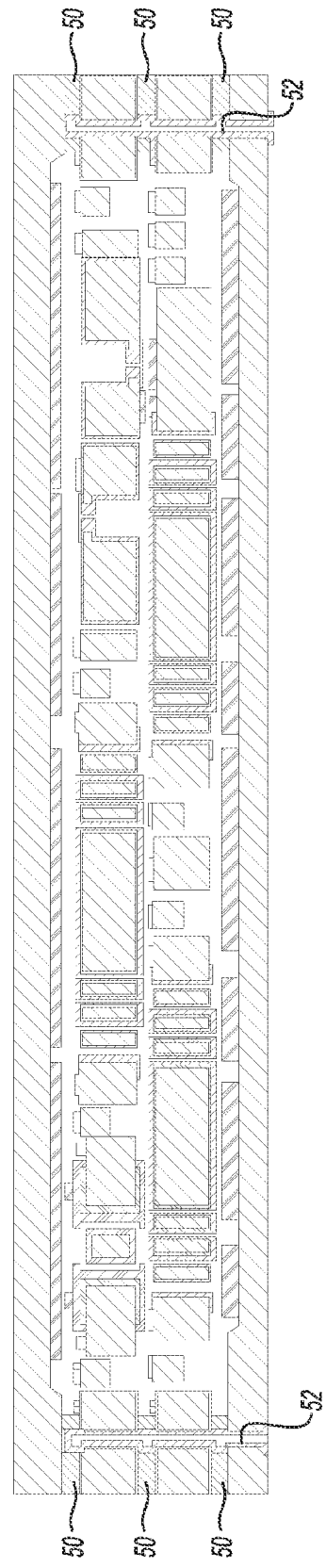

A non-limiting example of a method for forming a microsystem according to the present disclosure is depicted in FIGS. 11A through 11R together. As shown in FIG. 11A, a fused-silica layer 73 (e.g., 100 μm thick) is fusion bonded on opposed sides to two silicon wafers 71, 71' (e.g., each wafer 100 μm thick, the Si wafers to be used as masking layers). The front-side silicon 71 is through-etched using silicon deep reactive-ion etching (DRIE), and subsequently, the fused-silica wafer 73 is through-etched using the Si mask 71 (FIG. 11B). It is to be understood that portions of the assembly at this stage are being prepared for usage as a vibration isolator 17, a resonator 19, a planar resonant accelerometer 21, and a Z-axis resonant accelerometer 29 in the microsystem. Similarly, the backside silicon 71' is through-etched using silicon DRIE and subsequently the fused-silica wafer 73 is etched from the backside to locally thin isolator springs to form a flexible vibration isolation platform (FIG. 11C, note a thinned-down isolation beam at 31) or to make beams of different thicknesses to form a z-axis resonant accelerometer 29 or other device structure 106. The silicon masks 71, 71' are dissolved using, e.g., tetramethyl ammonium hydroxide (TMAH) wet etching. The fused silica layer 73 may then be annealed at a temperature ranging from about 1200° C. to about 1400° C. to reduce DRIE sidewall scalloping (FIG. 11D). The surface roughness of the DRIE patterns may be a major energy loss contributor, and may be minimized by using the process described above.

In the step depicted in FIG. 11E, low pressure chemical vapor deposition (LPCVD) is used to deposit a first high-Phosphorus doped polysilicon layer (first-poly) 32 to form a TCF-compensating layer for the integrated resonators and also to reduce the gap for capacitive sensors. The first-poly layer is either in-situ P-doped or doped separately to increase conductivity ($\rho \sim 10^{-3}$ $\Omega$-cm). The polysilicon layer 32 is selectively patterned using $XeF_2$ through a spray-coated photoresist mask (FIG. 11F). It is to be understood that forms of the word "pattern" used herein may include the concept of depositing and then patterning or patterning through the deposition process. The wafer is thermally oxidized to form a shallow oxide layer 33 around the polysilicon layer 32, which forms the gap between the resonator 19 and the electrode (second poly 45, discussed further below) (FIG. 11G). The thickness of the oxide layer 33 is thin so as to not consume the entire polysilicon layer 32. The thermal oxide layer 33 will be used as a sacrificial layer for the resonator 19. The oxide layer grown on comb-drive electrodes is etched away. To etch a shallow recess for the polysilicon trench refilling (for a vertical accelerometer), another pair of single-crystal silicon wafers 35, 35' is fusion bonded to each of the opposed sides. The single crystal silicon wafers 35, 35' are patterned, for example, using a two-step process (FIG. 11H). The fused silica is etched through in the regions where silicon has been etched through 39 (FIG. 11I). In the step depicted in FIG. 11J, the etch mask is removed using wet etchant.

In the step depicted in 11K, a second high-Phosphorus doped polysilicon layer ($2^{nd}$ poly) 45 is deposited using LPCVD and selectively patterned using $XeF_2$. FIG. 11K also includes representation of three subcomponents of the fused silica layer: the unreleased resonator 47, comb drive electrode 49, and polysilicon filled bridge 53. The planar resonant accelerometer 21 is depicted in FIG. 11K. The $2^{nd}$ poly 45 is a thick layer that closes the gap between the oxide layers and serves as the resonator drive and sensor electrodes. The $2^{nd}$ poly 45 is also selectively patterned using $XeF_2$, except the regions for the bridge 53, gyro and resonator electrodes (FIG. 11L). This layer will serve as an electrode layer for the resonator. Either single or differential mode vertical accelerometers may be made. The fused silica between the polysilicon bridges 53 is removed as indicated by the voids shown at 55. The vertical resonant accelerometer is complete as indicated by the section shown at 29' (FIG. 11M). A thin layer of metal 59, e.g., tungsten (W), is deposited selectively on the top of the gyroscopes and accelerometers using atomic layer deposition (ALD) with a shadow mask 57 on capacitive readout electrodes (this may also be accomplished using lithography) (FIG. 11N). If used, the shadow mask 57 is firmly attached to the fused silica layer to prevent unwanted deposition. If lithography is used, the tungsten layer is lithographically patterned using a spray coated photoresist mask (not shown). Other layers of metals 59' serving as a temperature sensor, a heater, and electrical leads from the vertical feedthrough 52 to the tungsten layer, are deposited (e.g., via sputter or evaporative deposition) using a similar shadow masking deposition technique (FIG. 11O). This completes the fabrication of the gyro and accelerometers.

In the step shown in FIG. 11P, a conformal layer of Parylene-Al-Parylene 65 is deposited to serve as an HF mask. The mask is open at the resonator gap. The resonator is released using HF as shown by the void indicated at 63. The HF mask is dry and wet etched, and the wafer is annealed again (e.g., at about 1000° C.) to remove moisture, organics, and ionic material trapped on the surface (FIG. 11Q). Then the silica wafer is aligned with a separately processed layer, and bonded using low-temperature (e.g., low thermal coefficient of expansion (TCE)) glass frit 50. Electrical connections, as indicated by continuous feedthroughs 52, between layers are formed using conformal deposition (e.g., sputtering) or solder paste (FIG. 11R).

The process described corresponding to FIGS. 11A-11R above is a suitable fabrication process. It is to be understood that other fabrication processes are within the purview of the present disclosure. It is further to be understood that various techniques (such as deposition techniques) within the process described above may also be substituted with other suitable techniques.

Figure 12:
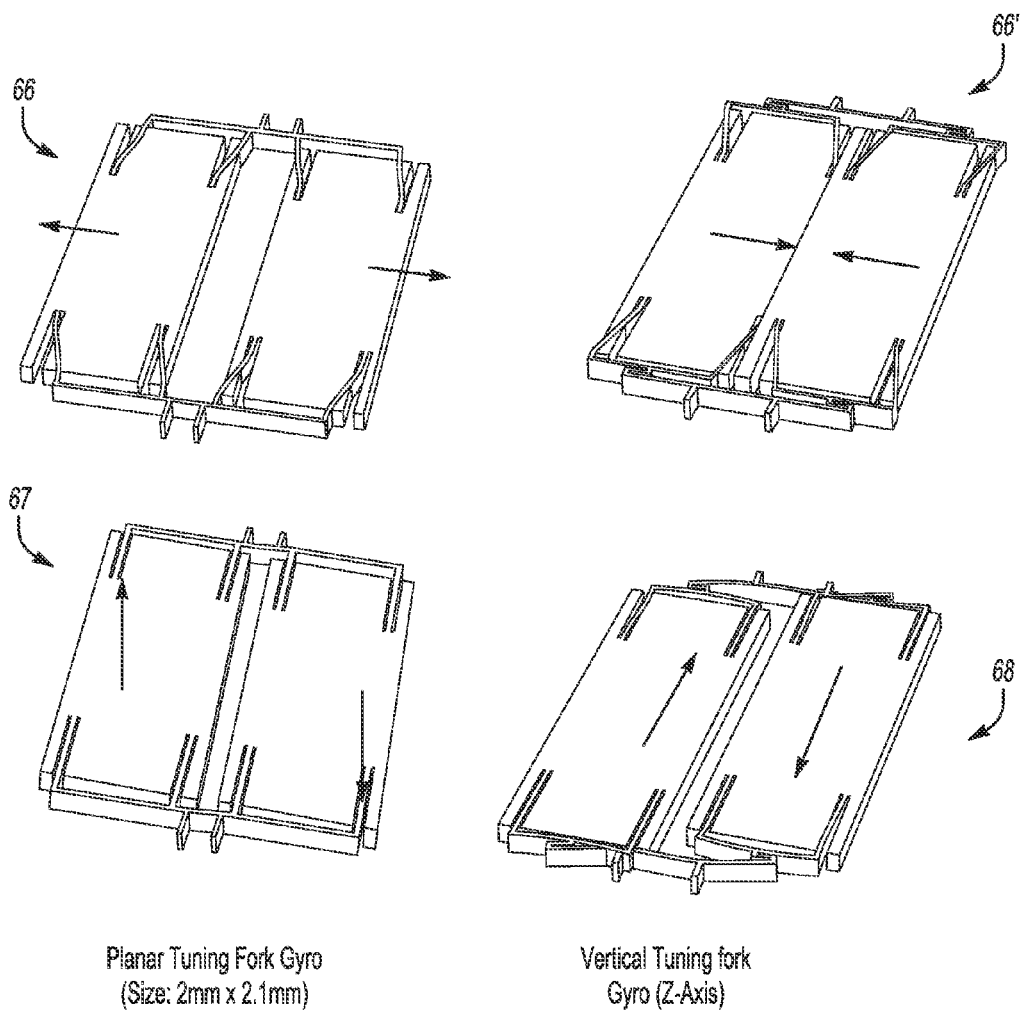
FIG. 12 is a set of perspective views of gyroscope architectures according to the present disclosure.

The MEMS device 43 may be a gyroscope. The main error sources of bias stability related to the mechanical structure are: scale factor change due to Q; frequency and temperature fluctuation; and sensitivity to vibration. Temperature is the main factor in variation of Q. Frequency change is dependent on both temperature and acceleration. Vibration sensitivity depends on the mode shape and the vibration isolating stage. In the disclosed architecture, the gyroscopes are integrated on a vibration and temperature isolating stage. As shown in FIG. 12, tuning-fork (TF) gyroscopes may be used in examples of the present disclosure. Driving and sensing modes of planar tuning fork gyroscope are shown at reference numerals 66 and 67, respectively. Driving and sensing modes of a yaw tuning fork gyroscope are shown at reference numerals 66' and 68, respectively. The TF architecture has advantages of simplicity, large effective mass, and large driving amplitude. However, in examples of the present disclosure, a ring gyroscope may be substituted for the TF gyroscope. As shown in Table 1 below, the disclosed gyroscopes have a mass of less than 600 μg, a simulated Q of greater than 1 million dominated by thermoelastic damping (TED), and an operating frequency of about 15 kHz. The operating frequency may be adjusted to reduce cross coupling between the sensors. The disclosed gyroscope may be configured to have mode separation between the parasitic modes and the drive or sensor greater than about 10%. Calculated performance with Finite Element Model (FEM) simulated Q factors is shown in Table 1. The overall Q of the tuning fork gyroscopes are substantially dominated by surface loss when the DRIE roughness is from about 10 nm to about 15 nm. If sidewall roughness is reduced to less than about 1.0 nm by annealing, other factors such as anchor loss or TED will dominate. To achieve the disclosed bias stability, temperature stability on the order of milli-degree is required. Such temperature control may be achieved using the methods disclosed herein. An open-loop mode may be used to produce a gyroscope with relatively higher sensitivity. A force-feedback mode may provide larger bandwidth.

TABLE 1

Calculated performance of disclosed gyros

|  | Planar TF gyro | Vert. TF gyro |
|---|---|---|
| Size (inc. elec) | 2 × 2 mm | 2 × 2 mm |
| Drive/Sense Cap | 0.4 pF/2 pF | 0.8 pF/1 pF |
| Mass | 600 µg | 600 µg |
| Q (simulated) | $Q_{TED}$ (×10$^6$) 1.2 (both modes) | 1.4(drive), 1.3 (sense) |
|  | $Q_{anchor}$ (×10$^6$) >4 (both modes) | >4 (both modes) |
|  | $Q_{surface}$ (×10$^6$) 1.5(drive) 1.8(sense) | 1.5 (both modes) |
| ARW (4 µm amplitude) | 3.3 × 10$^{-4}$ deg/√Hr | 3.3 × 10$^{-4}$ °/√Hr |
| Bias stability | 0.0095 deg/hr | 0.0095 deg/hr |

Figure 13A:
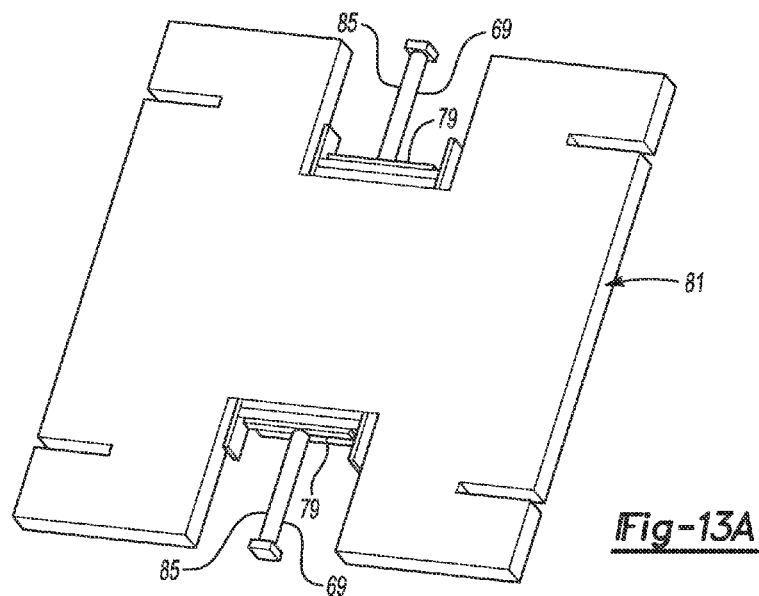
FIG. 13A is a semi-schematic perspective diagram depicting an example of a resonant accelerometer according to the present disclosure.
Figure 13B:
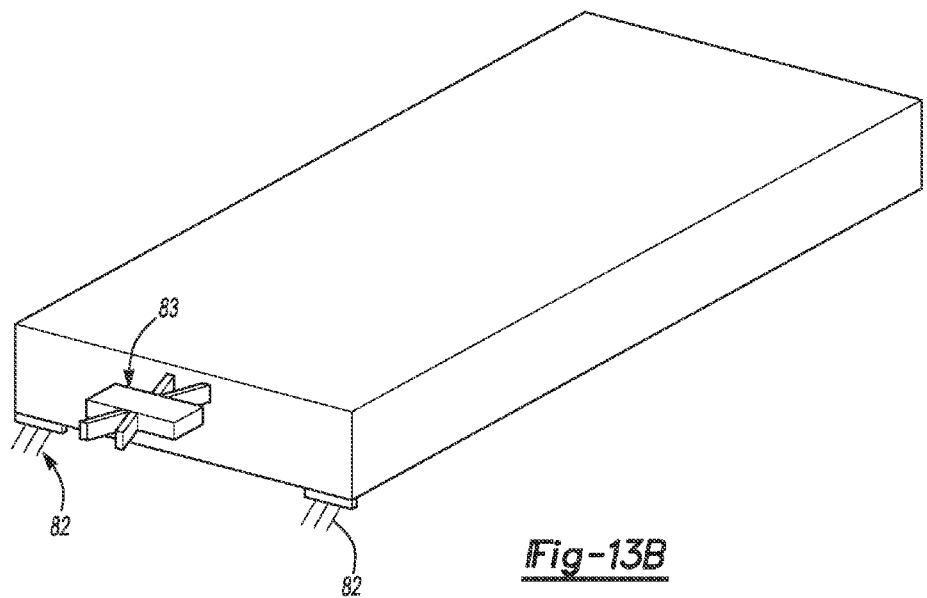
FIG. 13B is a semi-schematic perspective diagram depicting another example of a resonant accelerometer according to the present disclosure.

The MEMS device 43 may include an accelerometer that includes resonant devices in the place of the standard capacitive configurations. High-Q fused silica may allow relative performance improvements over a standard capacitive configuration. Isolation platforms as disclosed herein may reduce environmental sensitivity that has typically impacted resonant sensors. A double-ended tuning fork (DETF) resonant accelerometer for in-plane signals, and a vertically-hinged resonant accelerometer for out-of-plane signals are disclosed herein. (See FIGS. 13A and 13B.) It is to be understood that in examples of the present disclosure, a clamp-clamp beam resonant accelerometer, a vertically-hinged resonant accelerometer, or an electrostatic non-resonant accelerometer may be substituted for the DETF accelerometer. In FIG. 13A, a double-ended tuning fork is depicted at reference numeral 69. A force amplification lever is shown at reference numeral 79. A support beam is shown at reference numeral 81. In FIG. 13B, polysilicon hinges are depicted at reference numeral 82, and a polysilicon torsional resonator is shown at reference numeral 83. The accelerometers disclosed herein have relatively flexible vibrating tines 85. The disclosed microfabrication process allows deposition of high-aspect ratio polysilicon which allows the relatively flexible vibrating tines 85. The calculated performance specifications shown in Table 2 are based on flexible polysilicon tines 85 and hinges 82.

TABLE 2

Calculated accelerometer performance

|  | Planar res. accel | Vertical res. accel |
|---|---|---|
| Size (inc. elect.) | 1.8 × 1.8 mm$^2$ | 1.8 × 1.8 mm$^2$ (×2) |
| Sensor/Tine mass | 554 µg/375 ng | 600 µg/ng (×2) |
| Force amp. (lever) | 30 | 9 |
| Tine resonance frequency/Q | 60 kHz 2 × 10 × 200 µm poly-Si DETF/ 10,000 | 130 kHz 2 × 10 × 10) poly-Si/ 10,000 |
| Scale factor (ppm/g) | >1000 ppm/g (>600 Hz/g) | 860 ppm (=112 Hz/g) |
| Stability | <10 µg | <10 µg |

Figure 14A:
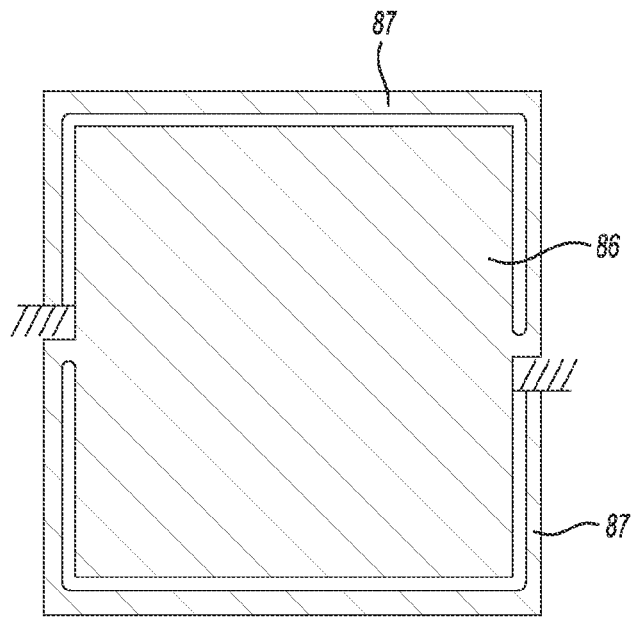
FIG. 14A is a semi-schematic diagram depicting an example of a gyro/resonant accelerometer platform according to the present disclosure.
Figure 14B:
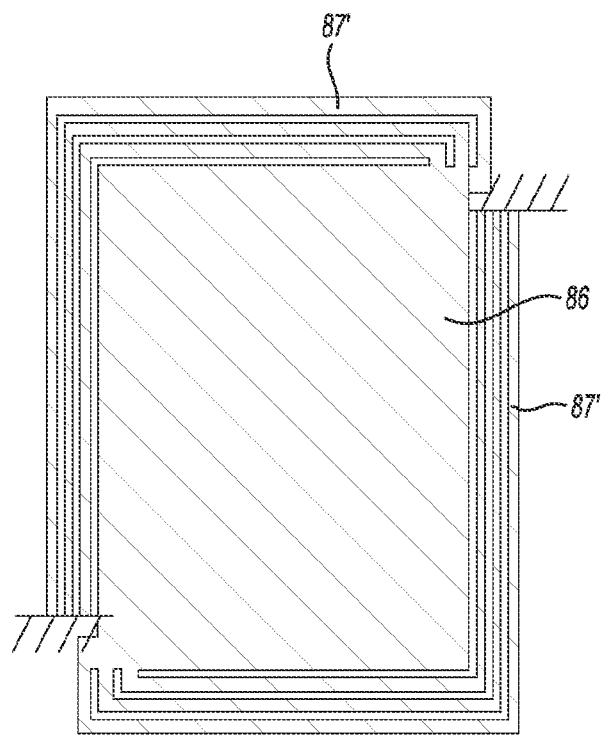
FIG. 14B is a semi-schematic diagram depicting an example of a resonator platform according to the present disclosure.

The MEMS device 43 may include thermal-and-vibration-isolating platforms integrated with each of the sensors disclosed herein. (See FIGS. 14A and 14B.) In FIGS. 14A and 14B, an isolated mass 86 is shown loosely supported by long spring members 87, 87'. Isolating the sensors will reduce an acoustic cross-coupling effect, and allow individual tuning of a resonant frequency for each isolating platform. Further, isolating platforms will improve thermal impedance due to reduction of lead lines. The disclosed architecture achieves improvement in both mechanical and thermal aspects. From FEM simulation, lateral and rotational cutoff frequencies may be selected. As shown in Table 3, the selected lateral and rotational cutoff frequencies may range from about 2 kHz to about 10 kHz for a beam height of 100 µm. With a thinner beam height, the cutoff frequency may be further reduced.

TABLE 3

| Gyro/Resonant Accelerometer Platform (Tether thickness: 100 µm) | Filter Modes (kHz) | 1) Lateral to vertical transl.: 2.4~5 |
|---|---|---|
|  |  | 2) Lateral tilting: 3.4~5 |
|  |  | 3) Yaw: 8 |
|  | Gyro operating freq. zone (kHz) (without any parasitic mode) | 8.3~32 |
|  | Thermal resistance from conduction (K/W) | >1 × 10$^5$ (dominated by leads & tether) |
| Resonator Platform (Tether thickness: 50 µm) | Filter Modes (kHz) | 1) Lateral Translation: 1~3 (Goal < 1): ~500 Hz) |
|  | Thermal resistance from conduction (K/W) | 2 × 10$^5$ (dominated by electric leads) |

Sense mode frequency shift of a lateral gyroscope due to electrical softening may be reduced by further improvements to the structure of the stage and the gyro-controlling architecture. A preliminary configuration for an example of a resonator achieves a cutoff frequency from about 1 kHz to about 3 kHz along a lateral translational mode. (The example of the resonator is sensitive in the lateral direction.) With the disclosed architecture, a thermal resistivity due to conduction of 10$^5$ K/W may be achieved.

For shock protection, soft-material coatings (i.e. evaporated gold) may be disposed on all available MEMS device 43 surfaces as well as the cap inner surface 36, the base inner surface 26, the partition first surface 76 and the partition second surface 77 (see FIGS. 1, 6 and 9).

Figure 15:
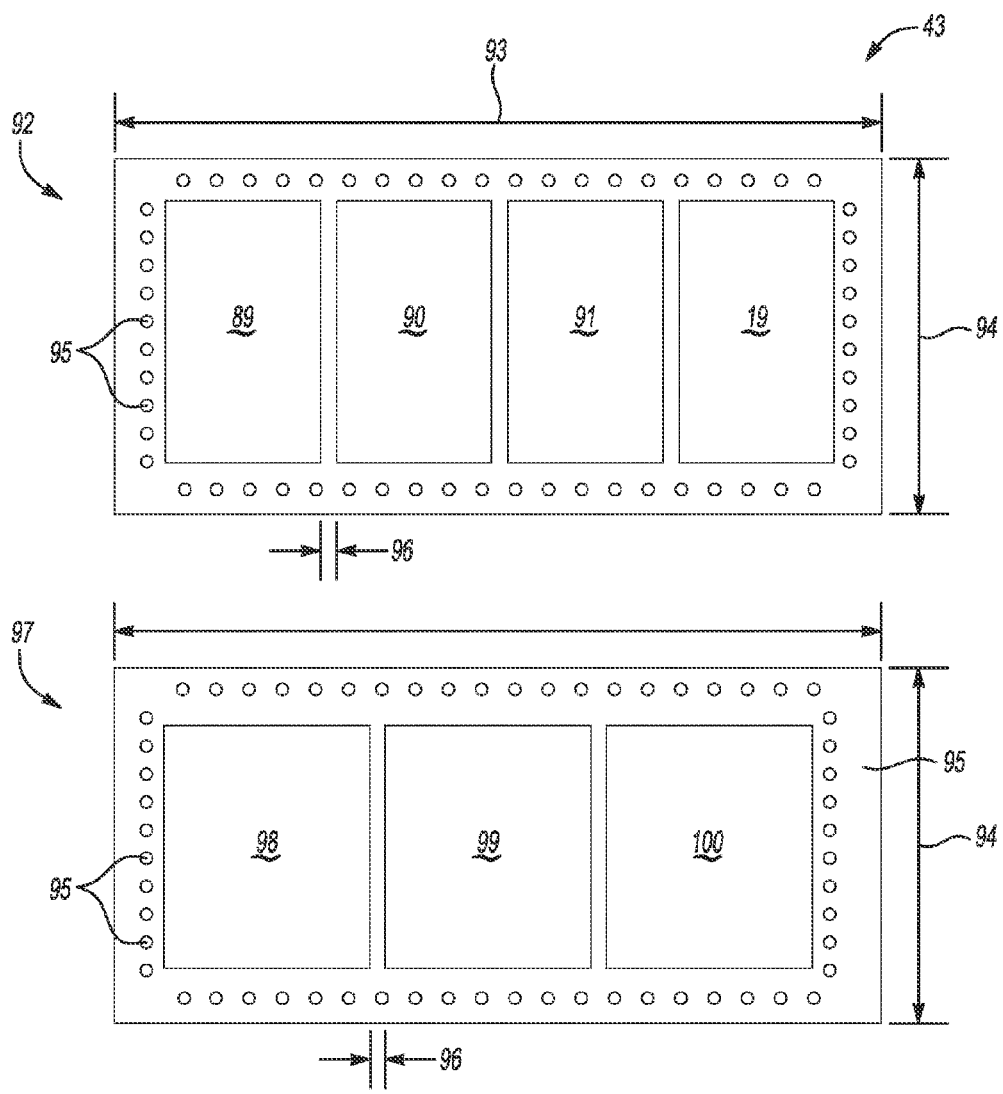
FIG. 15 is a semi-schematic diagram depicting an example of an overall MEMS device placement for an active area according to the present disclosure.

FIG. 15 depicts an example of an overall MEMS device 43 placement for an active area. In the example, the bottom MEMS device layer 97 includes three-axis gyroscopes 98, 99, 100, and the top MEMS device layer 92 includes three-axis resonant accelerometers 89, 90, 91 and a clock resonator 19. An x-axis accelerometer 89, a y-axis accelerometer 90, and a z-axis accelerometer 91 are show in the same (top) layer as resonator 19. In the example depicted in FIG. 15, the top MEMS device layer 92 has a length 93 of about 8.3 mm (millimeters) and a width 94 of about 3.3 mm. Spacing 96 between the accelerometers 89, 90, and 91 is about 100 micrometers. The bottom device layer 97 includes an x-axis gyroscope with a platform 98, a y-axis gyroscope with a platform 99, and a z-axis gyroscope with a platform 100. As depicted, the example has suspension beams with 100 µm width formed between every sensor and about the perimeter of the MEMS device layer for placing: 1) electrical leads, 2) nonlinear-beam/soft-coating shock stops along the lateral regions, 3) sensing electrode for the z-axis resonant accelerometer, and 4) a damper for acoustic energy isolation between sensors. Vertical feedthrough holes 95 are about 400 µm×400 µm. Both the cap layer 30, the package base layer 20 will include shock protection/radiation shields (not shown) and bottom electrodes (not shown) for lateral tuning-fork gyros.

Figure 16:
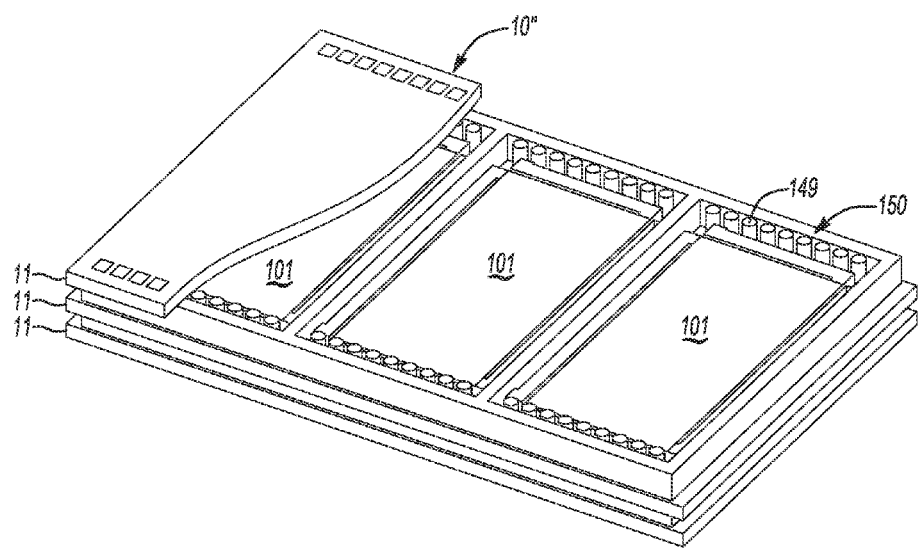
FIG. 16 is a semi-schematic perspective diagram depicting an example of isolating stages in a microsystem according to the present disclosure.

FIG. 16 is a semi-schematic perspective diagram depicting and example of isolating stages 101 in a microsystem 10" according to the present disclosure. Three fused silica layers 11 are stacked to form the microsystem 10". A bonding seal ring 150 is shown at the perimeter. Vertical feedthroughs are shown at 144.

Figure 17:
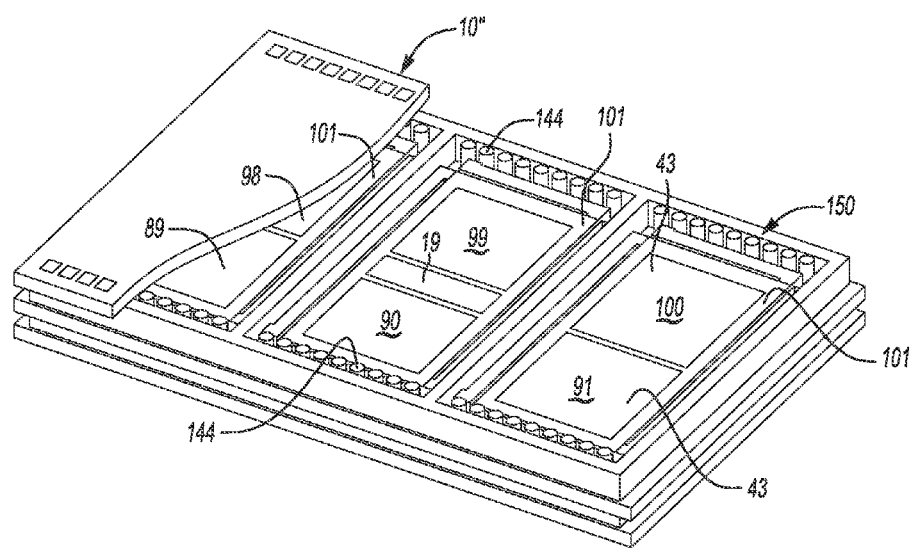
FIG. 17 is a semi-schematic perspective diagram depicting an example of MEMS devices integrated with the isolating stages of FIG. 16 in a microsystem according to the present disclosure.

FIG. 17 is a semi-schematic perspective diagram depicting an example of MEMS devices 43 integrated with the isolating stages of FIG. 16 in a microsystem 10" according to the present disclosure. FIG. 17 depicts 7 MEMS devices 43 integrated with 3 isolating stages 101. In the example depicted in FIG. 17, the MEMS devices 43 include three gyroscopes 98, 99, 100, three accelerometers 89, 90, and 91, and a resonator 19.

Figure 18:
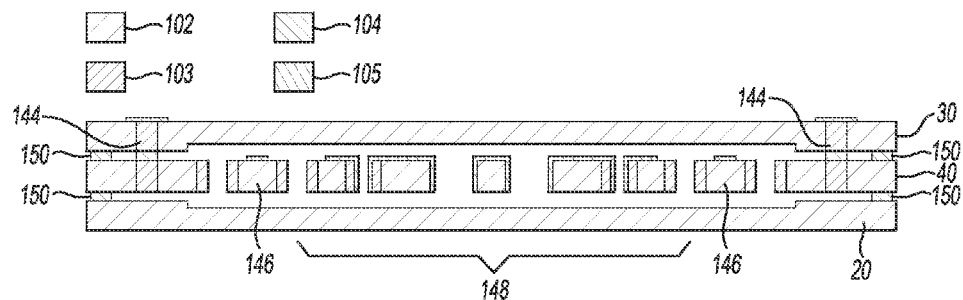
FIG. 18 is a semi-schematic side cross-sectional view depicting an example of a TIMU according to the present disclosure.

FIG. 18 is a semi-schematic side cross-sectional view depicting an example of a TIMU according to the present disclosure. Materials in the example are depicted with different crosshatch patterns. The crosshatch pattern shown at 102 depicts fused silica; 103 depicts Poly-Si; 104 depicts metal for thermal compression bonding; and 105 depicts metal for electrodes and interconnects. It is to be understood that the mapping of crosshatch patterns to materials from FIG. 18 is not necessarily applicable to any other figures in this disclosure unless specifically stated herein. Isolation legs 146 support the tuning fork gyro 148. Vertical feedthroughs 144 allow connection to the MEMS device layer 40 through the cap layer 30. Bonding seal rings 150 are shown between the cap layer 30 and the MEMS device layer 40 and between the MEMS device layer 40 and the packaging base layer 20.

Figure 19:
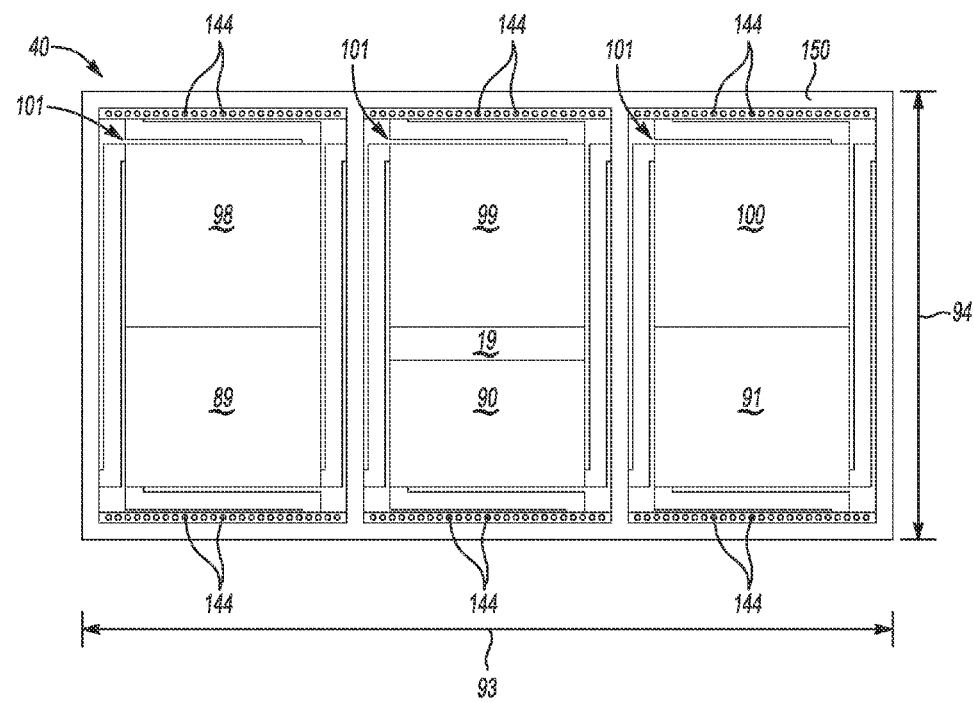
FIG. 19 is a semi-schematic top cross-sectional view depicting an example of the TIMU of FIG. 18 according to the present disclosure.

FIG. 19 is a semi-schematic top cross-sectional view depicting an example of the TIMU of FIG. 18 according to the present disclosure. The x-axis gyroscope 98 and the x-axis accelerometer 89 are shown on a common isolating stage 101. The y-axis gyroscope 99 and the y-axis accelerometer 90 and the resonator 19 are also shown on the common isolating stage 101 adjacent to the isolating stage 101 associated with the x-axis. On the right side in FIG. 19, the z-axis gyroscope 100 and the z-axis accelerometer 91 are shown on a common isolating stage 101. A bonding seal ring 150 is shown at the edge of the device layer. An approximate length 93 of the TIMU shown is about 7.3 mm, and an approximate width 94 is about 4.36 mm. The thickness (not shown) of the TIMU in FIG. 19 is about 0.3 mm. Therefore, the volume of the TIMU shown in FIG. 19 is about 9.55 mm^3 (cubic millimeters).

Figure 20:
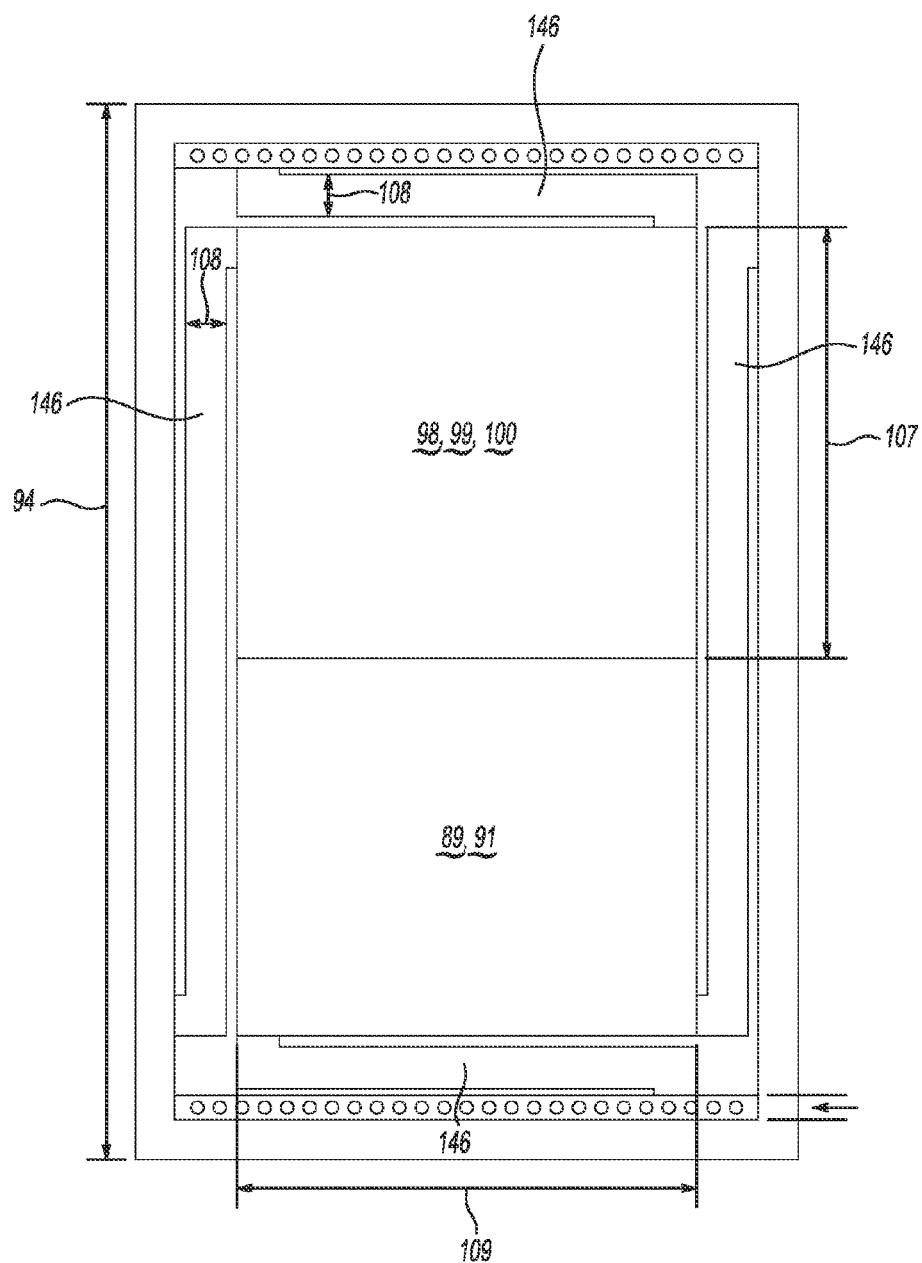
FIG. 20 is a semi-schematic top cross-sectional view depicting a scaled example of a portion of the TIMU of FIG. 19 according to the present disclosure.

FIG. 20 is a semi-schematic top cross-sectional view depicting a scaled example of a portion of the TIMU of FIG. 19 according to the present disclosure. The dimension depicted at 94 corresponds to the width 94 depicted in FIG. 19. The dimension shown at reference numeral 108 associated with isolating legs 146 is about 100 micrometers. The gyroscope 98, 99, 100 dimensions are depicted at reference numerals 107 and 109 are respectively about 2.0 mm and about 2.0 mm. Dimensions for other portions of the example of a TIMU may be approximated by their relative size in FIG. 20.

Figure 21A:
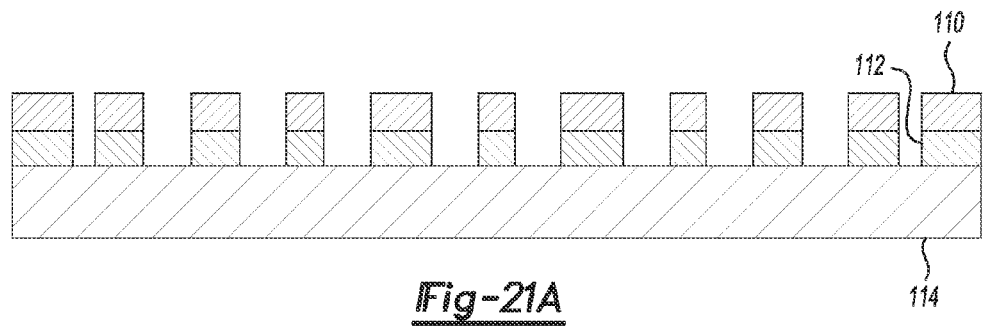
FIGS. 21A-21N are semi-schematic side cross-sectional views depicting examples of steps in a process according to the present disclosure.
Figure 21B:
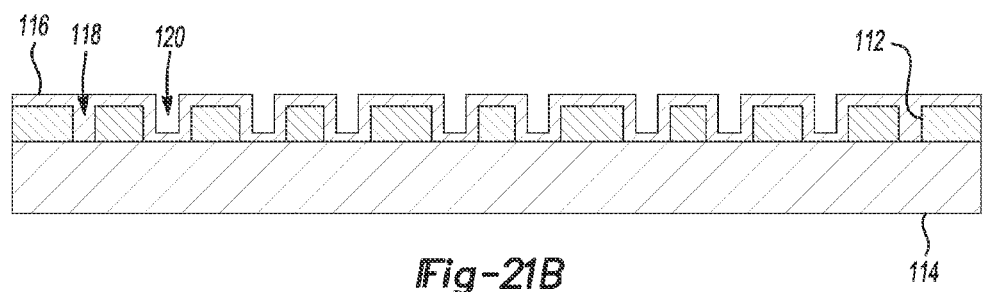
Figure 21C:
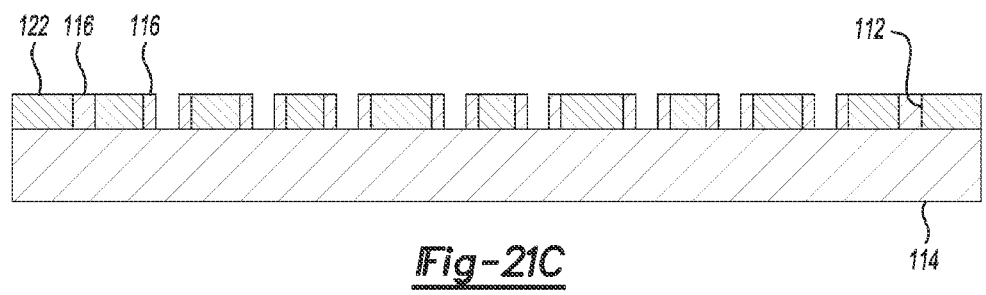
Figure 21D:
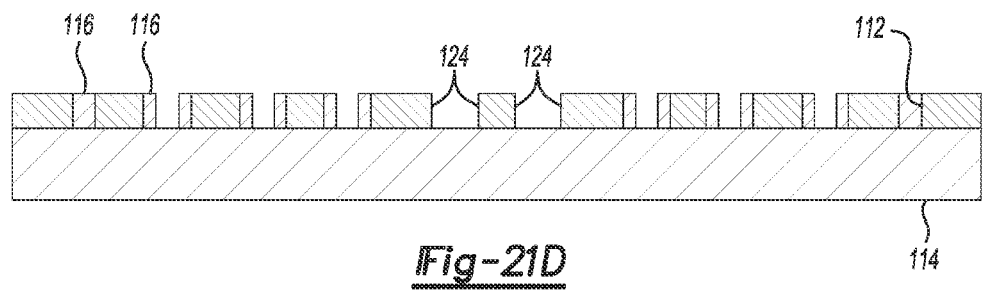
Figure 21K:
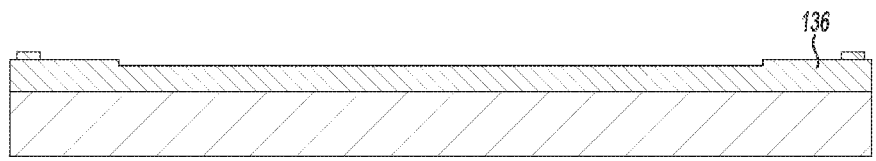
Figure 21L:
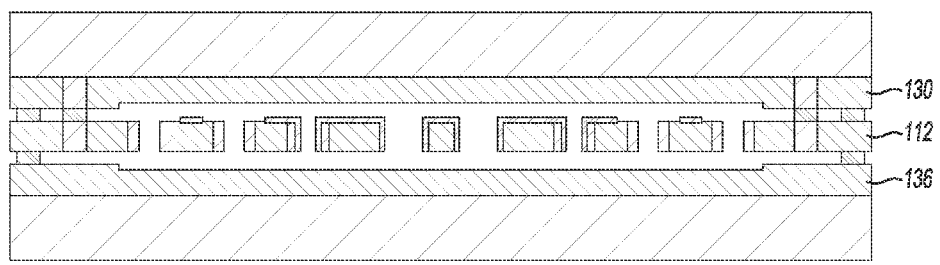
Figure 21M:
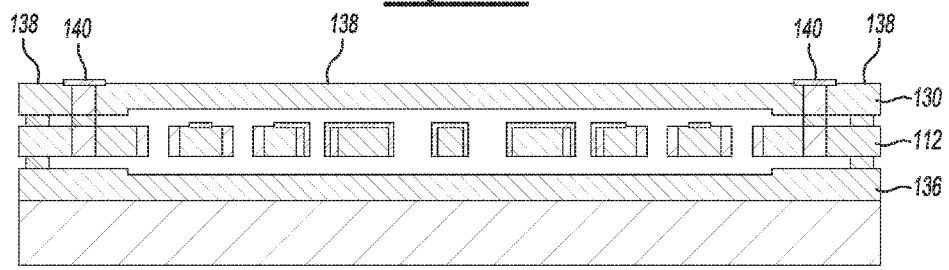
Figure 21N:
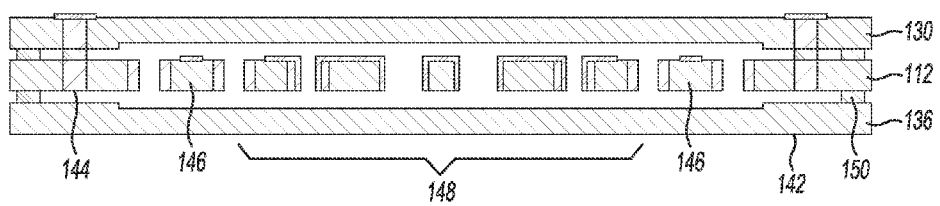

FIGS. 21A-21N collectively depict a semi-schematic side cross-sectional view depicting examples of steps in a process according to the present disclosure. It is to be understood that this process is suitable for devices with in-plane vibration modes only. A tuning fork gyro is given as an example in the process described below.

With particular reference to FIG. 21A, step 1 of the process is represented, which includes a pattern masking layer 110 and DRIE of a first fused silica wafer 112. In examples, the pattern masking layer 110 may be nickel, Si, or poly-Si. In this example, a Si wafer 114 is non-permanent bonded to the first fused silica wafer 112, but other bonding types may be used. FIG. 21B represents step 2, which includes depositing poly-Si 116 to fill and narrow trenches in the fused silica layer 112 and dope the poly-Si. An example of filling a trench and narrowing a trench is indicated by reference numerals 118 and 120, respectively. FIG. 21C represents step 3, which includes timed etching of the poly-Si followed by chemical mechanical planarization (CMP) if desired (i.e., the CMP portion is optional). Reference numeral 122 indicates a portion of the material having been removed, depicting an exposed surface of the fused silica layer 112. Step 4 is represented in FIG. 21D and includes using a shadow mask to remove poly-Si from particular selected, which may depend upon a design application or an intended usage of the device. The selected regions are indicated by reference numeral 124, depicting other exposed surfaces of the fused silica layer 112. Step 5 is represented in FIG. 21E and includes depositing a first metal layer 126 using a shadow mask to form electrodes and interconnects. In step 6, as represented in FIG. 21F, the process includes depositing and patterning a second metal layer 128 for bonding and contacts.

Continuing in the process of FIGS. 21A-21N, step 7 includes patterning a second fused silica wafer 130 in a manner similar to that discussed above (FIG. 21G). Step 8 includes bonding the first and second fused silica wafers (112 and 130, respectively) using, e.g., thermal compression bonding (FIG. 21H). Step 9 includes removal of the bottom Si wafer (FIG. 21I). It is to be understood that fused silica wafer 112 is the device layer in this example process. As shown in 21I, the elements of the device layer 112 remain bonded after Si wafer removal. Reference numeral 132 indicates an exposed surface of fused silica wafer 112 where there is no longer a Si wafer. Step 10 includes depositing and patterning another metal layer 134 at portions of the back side of the device layer 112 for bonding (FIG. 21J). Step 11 includes patterning a third fused silica wafer 136 (FIG. 21K). As related to 21L, step 12 includes bonding the third fused silica wafer 136 to the structure of step 10. Step 13 includes removal of the top Si wafer (indicated by reference numeral 138, which identifies a newly exposed surface) and patterning a metal layer 140 to form the contact pads (FIG. 21M). Step 14 relates to FIG. 21N and includes removal of the bottom Si wafer (indicated by reference numeral 142, which identifies another newly exposed surface). As shown in 21N, with the conclusion of step 14, a vertical feedthrough is formed (e.g., at 144), an isolation stage is developed (including isolation legs 146), a tuning fork gyroscope is formed (indicated generally at 148) within the isolation legs 146, and a bonding ring 150 is included.

Figure 22:
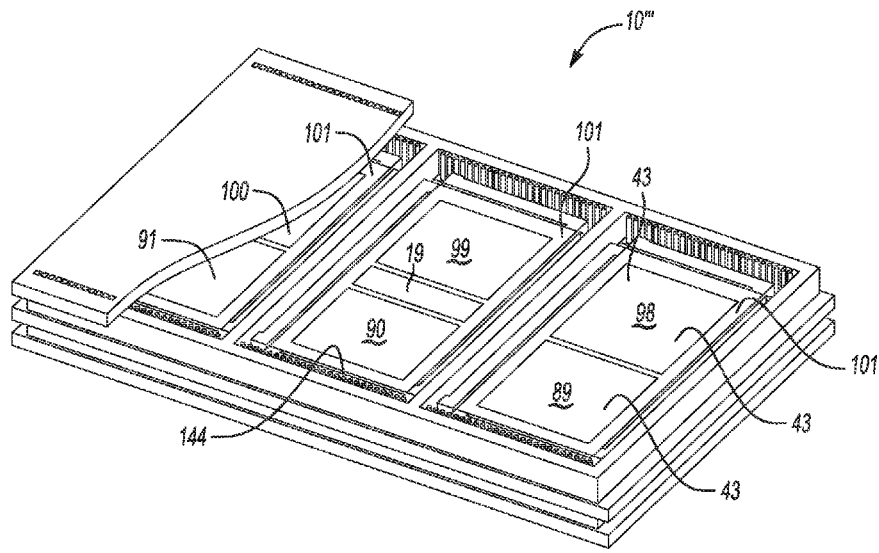
FIG. 22 depicts a cutaway perspective view of an example of a TIMU according to the present disclosure.

FIG. 22 depicts a cutaway perspective view of an example of a TIMU according to the present disclosure. MEMS devices 43 are depicted on isolating stages in a microsystem 10'''. FIG. 22 depicts 7 MEMS devices 43 integrated with 3 isolating stages 101. In the example depicted in FIG. 22, the MEMS devices 43 include three gyroscopes 98, 99, 100, three accelerometers 89, 90, and 91, and a resonator 19. As illustrated by comparing FIG. 22 and FIG. 17, a variety of arrangements of the MEMS devices 43 is disclosed herein.

Figure 23A:
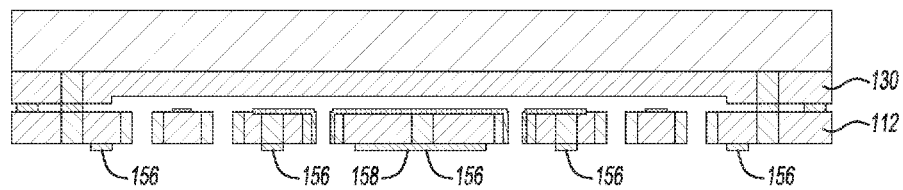
FIGS. 23A-23G are semi-schematic side cross-sectional views depicting examples of additional steps in the process depicted in FIGS. 21A-21N for out-of-plane vibration modes according to the present disclosure.
Figure 23B:
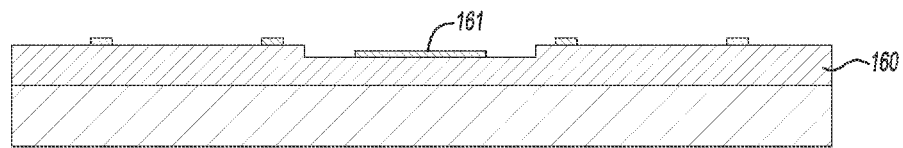
Figure 23C:
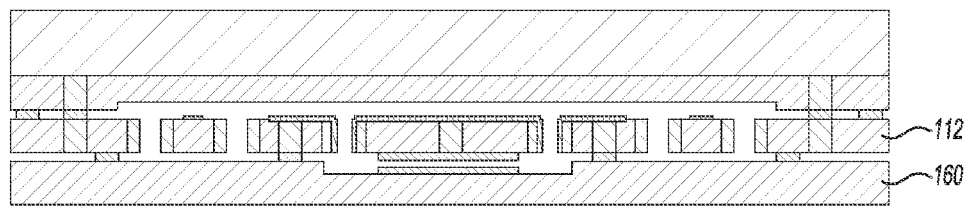
Figure 23D:
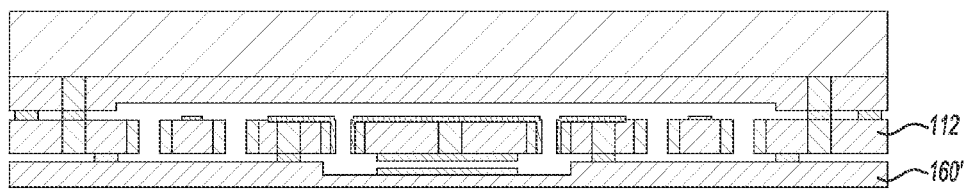
Figure 23E:
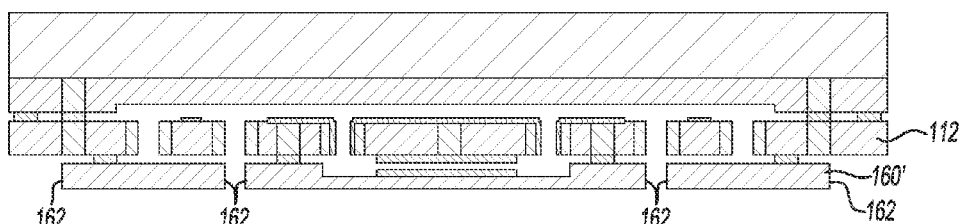
Figure 23F:
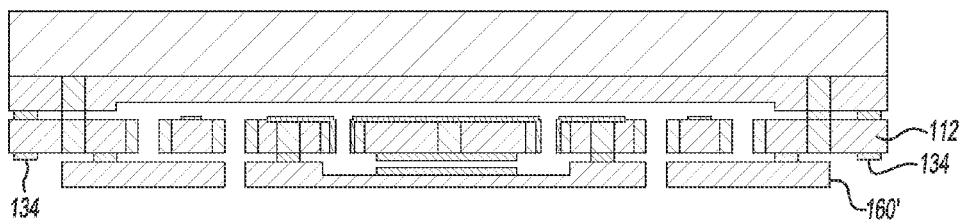
Figure 23G:
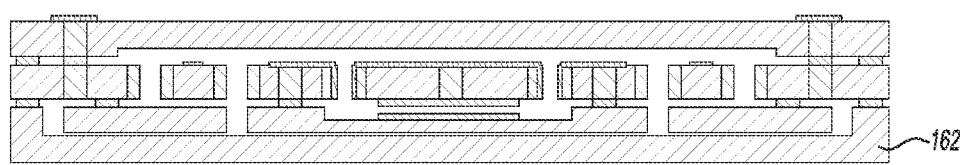

FIGS. 23A-23G are representative of a process flow for devices with an out-of-plane vibration mode. It is to be understood that devices with these requirements may need about three extra masks. The steps described here will be carried out after steps 1-9 discussed above (i.e., after 21I). Therefore these steps will be referred to as step 9.1, 9.2, etc. Step 9.1 represented by FIG. 23A includes patterning metal 156 on the back side of the device layer 112 including one portion of the metal 156 serving as an electrode 158. Note that the patterning does not reach the region of the proof mass and supporting beams. Step 9.2 includes preparing a fused silica wafer 160 with patterns as indicated by FIG. 23B. Also note the portion of the fused silica wafer 160 serving as an electrode 161. Step 9.3 includes bonding as shown in FIG. 23C, bringing together fused silica wafer 112 with fused silica wafer 160. Step 9.4 includes thinning the bottom fused silica wafer 160 to result in thinned fused silica wafer 160' as shown in FIG. 23D. Step 9.5 includes patterning the bottom fused silica wafer as shown in FIG. 23E, exposing portions of fused silica wafer 160' as indicated at reference numeral 162. It is to be understood that step 9.5 may be accomplished prior to step 9.4.

Moving forward in this example process, step 10 corresponds to the previously discussed step 10. Compare FIG. 23F to FIG. 21J. Step 10 includes depositing and patterning another metal layer 134 at the backside of the device layer for bonding and contacts. Steps 11-14 correspond to that discussed above, including the results as shown in FIG. 23G, adding another fused silica layer 162. Note that the cavity and thickness of the fused silica wafer 162 is slightly exaggerated as compared to the previous structure. A device with an out-of-plane vibration mode is represented at reference numeral 164.

Figure 24A:
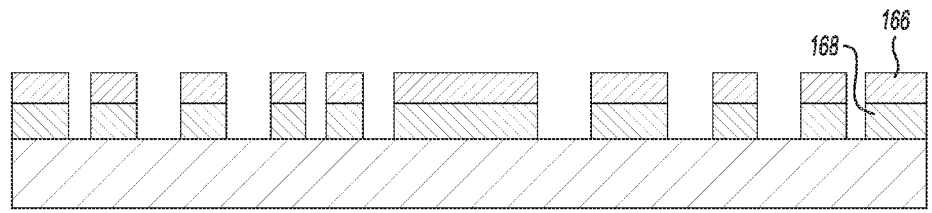
FIGS. 24A-24E are semi-schematic side cross-sectional views depicting examples of steps in a process for fabricating a MEMS device clock according to the present disclosure.
Figure 24B:
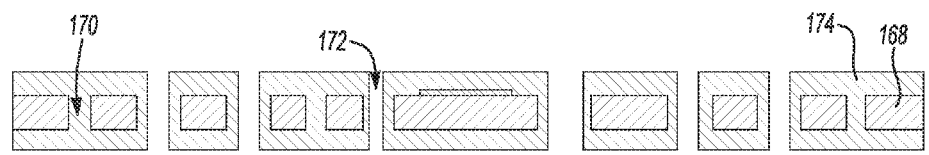
Figure 24C:
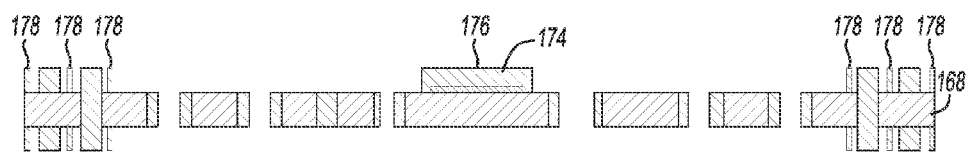
Figure 24D:
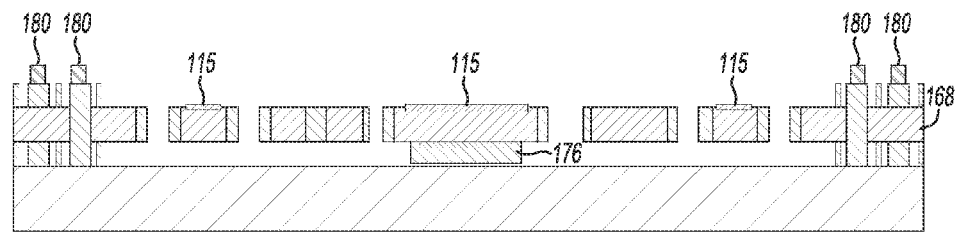
Figure 24E:
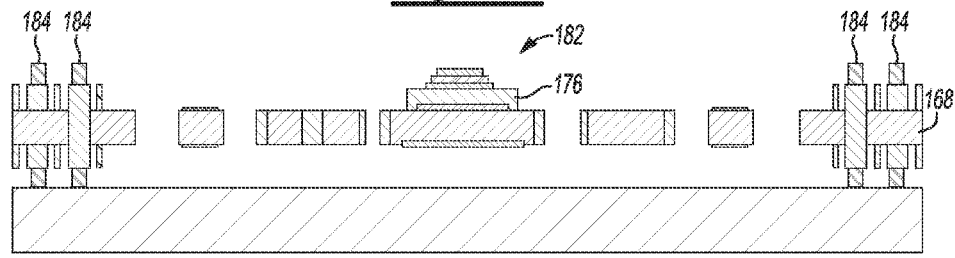

FIGS. 24A-24E are semi-schematic side cross-sectional views depicting examples of steps in a process for fabricating a MEMS clock device. It is to be understood that this process may require about 13 masks. In Step 11 as indicated in FIG. 24A, the process includes a pattern masking layer 166 and DRIE of a fused silica wafer 168. Step 12 is represented in FIG. 24B including depositing and patterning doped poly-Si, SiN and SAC ox. It is to be understood that this depositing and patterning is to fill a via, creating embedded protective SIN and SAC ox, and is also to narrow a gap in the fused silica wafer 168. The poly-Si is indicated by reference numeral 174. Note the filled via at 170 and the narrowed gap at 172. Step 13 (FIG. 24C) includes patterning the Poly-Si 174 to create a poly plate 176 for process and to create solder bond protective walls 178. Step 14 (FIG. 24D) includes patterning a heater/temperature sensor 115, and solder 180 on the backside as indicated in FIG. 24D. Note the solder at 180. Step 15 is represented in FIG. 24E and includes application of the resonator process 182 and includes patterning solder 184 on top. Also included is the removal of the refilled poly on the support/VIS beam. It is to be understood that at the conclusion of step 15, the MEMS device clock (DEV1) is ready for bonding.

Figure 25A:
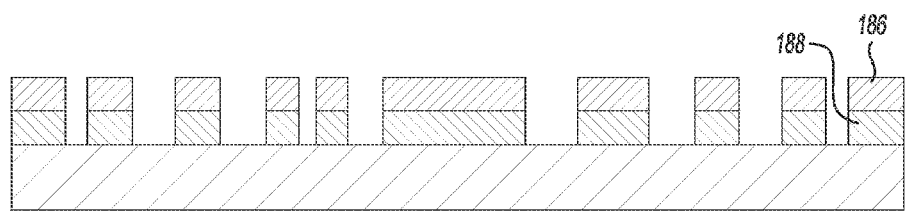
FIGS. 25A-25E are semi-schematic side cross-sectional views depicting examples of steps in a process for fabricating a MEMS gyroscope/accelerometer device according to the present disclosure.
Figure 25B:
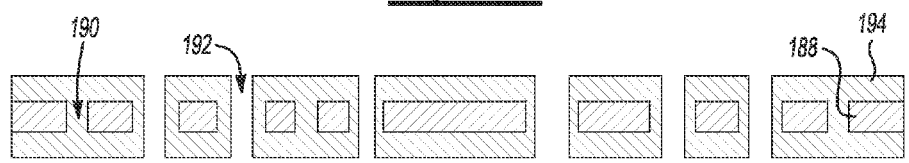
Figure 25C:
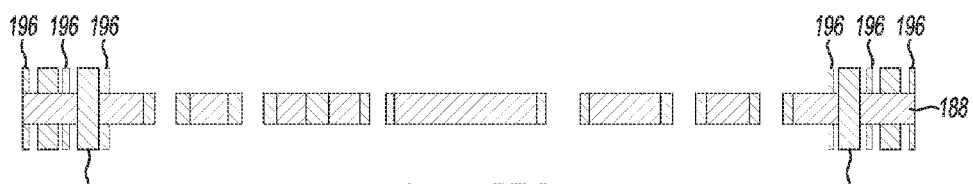
Figure 25D:
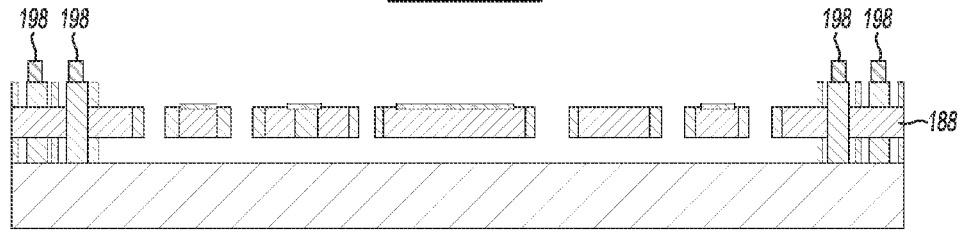
Figure 25E:
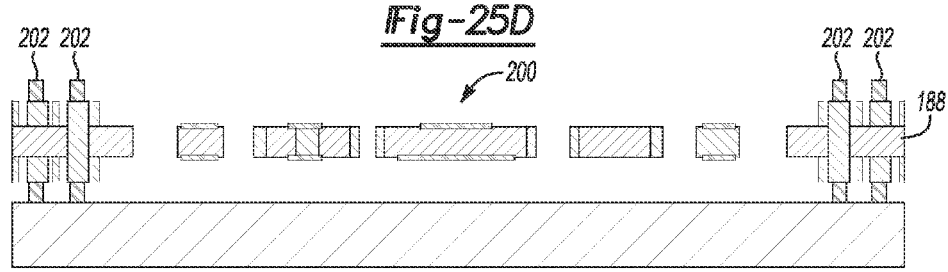

FIGS. 25A-25E are semi-schematic side cross-sectional views depicting examples of steps in a process for fabricating a MEMS gyroscope/accelerometer device according to the present disclosure. It is to be understood that this process may require about 8 masks. Step 21, as indicated in FIG. 25A, includes a pattern masking layer 186 and DRIE of a fused silica wafer 188. Step 22 is represented in FIG. 25B and includes depositing doped poly-Si 194 to fill a via (the filled via indicated by reference numeral 190) and to create narrowed gaps in the fused silica wafer (the narrowed gaps indicated by reference numeral 192). Step 23 (FIG. 25C) includes patterning Poly 194 to create solder bond protective walls indicated by reference numeral 196 in FIG. 25C. Step 24 (FIG. 25D) includes patterning a heater, temperature sensor, and solder on the backside. Note the solder at 198. Step 25 is represented in FIG. 25E and includes application of the resonator process 200 and patterning of solder 202 on top along with removal of refilled poly on the support/VIS beam. It is to be understood that at the conclusion of step 25, the gyroscope/accelerometer (DEV2) is ready for bonding.

Figure 26A:
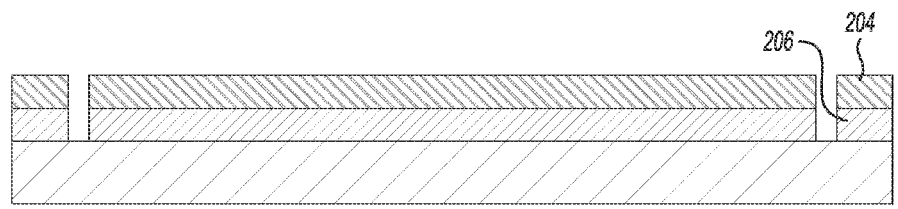
FIGS. 26A-26E are semi-schematic side cross-sectional views depicting examples of steps in a process for fabricating cap layers according to the present disclosure.
Figure 26B:
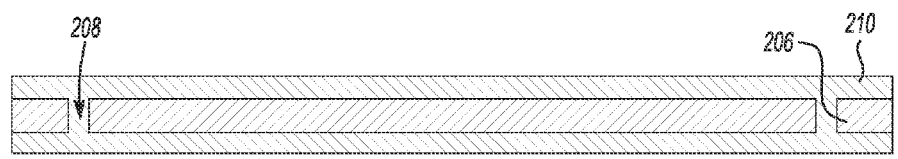
Figure 26C:
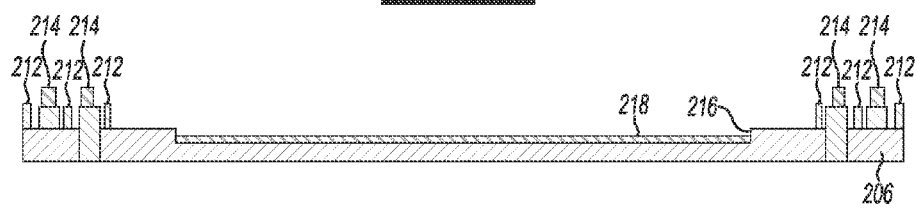
Figure 26D:
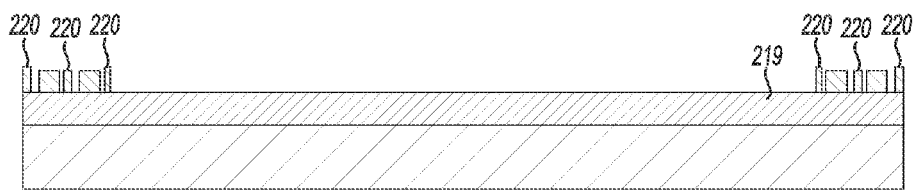
Figure 26E:
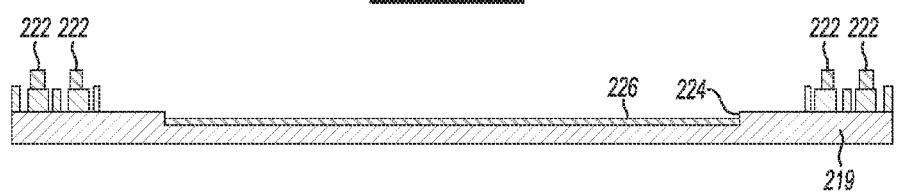

FIGS. 26A-26E are semi-schematic side cross-sectional views depicting examples of steps in a process for fabricating cap layers according to the present disclosure. Steps 31-33 will discuss fabrication of a Cap3, and Steps 41-42 will discuss fabrication of a Cap4. Step 31, as indicated in FIG. 26A, includes a pattern masking layer 204 and DRIE of a fused silica wafer 206. Step 32 is represented in FIG. 26B and includes depositing doped poly-Si 210 to fill a via (the filled via indicated by reference numeral 208). Step 33 is represented in FIG. 26C and includes patterning poly 210 to create solder bond protective walls 212. Step 33 also includes patterning solder 214, etching a recess (edge of recess indicated by reference numeral 216), and depositing a getter 218. At this point, Cap3 is ready for bonding. Now referring to FIG. 26D, Step 41 includes depositing and patterning poly-Si on a fused silica wafer 219 for solder bond protective walls 220. Step 42, represented in FIG. 26E, includes patterning solder 222, etching a recess (edge of recess indicated by reference numeral 224) and depositing a getter 226. At this point, Cap4 is ready for bonding.

Figure 27:
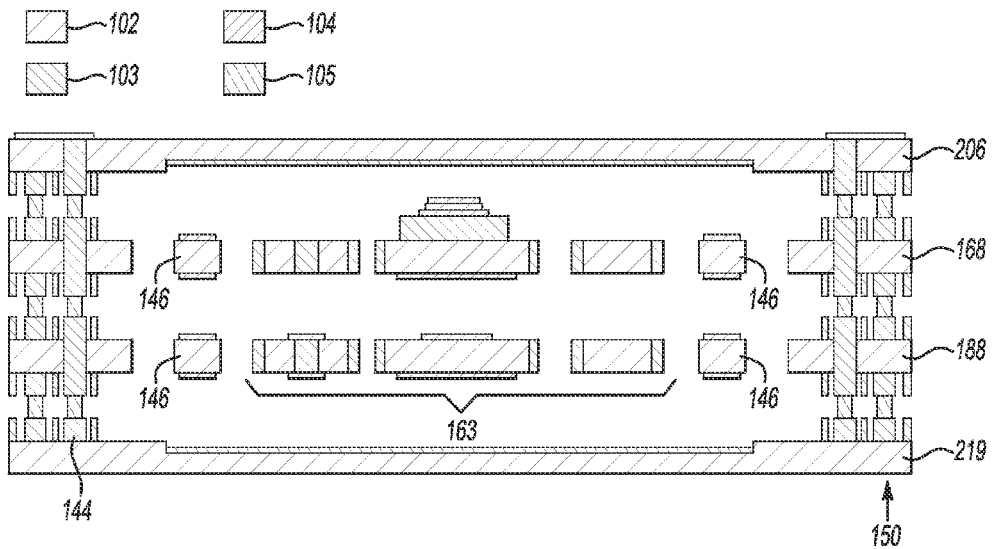
FIG. 27 is a semi-schematic side cross-sectional view depicting an example of feedthroughs in a microsystem according to the present disclosure.

FIG. 27 is a semi-schematic side cross-sectional view depicting an example of feedthroughs (indicated at reference numeral 144) in a microsystem according to the present disclosure. Materials in the example are depicted with different crosshatch patterns. The crosshatch pattern shown at 102 depicts fused silica; 103 depicts Poly-Si, 104 depicts metal for thermal compression bonding; and 105 depicts metal for electrodes and interconnects. It is to be understood that the mapping of crosshatch patterns to materials from FIG. 27 is not necessarily applicable to any other figures in this disclosure unless specifically stated herein. The microsystem shown includes fused silica layers 206, 168, 188, and 219. The microsystem of FIG. 27 includes devices as indicated at reference numeral 163. The devices 163 may include a clock, accelerometer and gyroscope. In this example, vertical feedthroughs 144 run from top cap 206 to bottom cap 219 allowing connection to the device layers 168, 188. Shown also are legs of an isolating stage 146 and a bonding seal ring 150.

Figure 28:
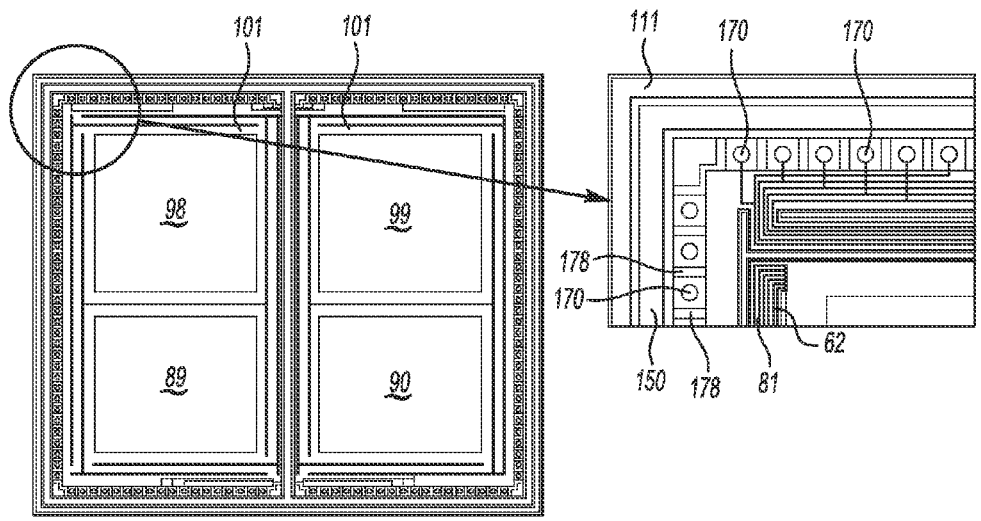
FIG. 28 is a semi-schematic top view depicting an example of a TIMU with vias according to the present disclosure.

FIG. 28 is a semi-schematic top view depicting an example of a TIMU with vias according to the present disclosure. An x-axis gyroscope 98 and an x-axis accelerometer 89 are shown on a common isolating stage 101. The y-axis gyroscope 99 and the y-axis accelerometer 90 are shown on the common isolating stage 101 adjacent to the isolating stage 101 associated with the x-axis. A bonding seal ring 150 is shown at the edge of the device layer. Surrounding the bonding seal ring 150 is a saw street 111 to allow space for dicing. A poly-Si filled via 170 is depicted with solder stops.

In FIG. 28, a poly-Si filled via 170 is shown having solder bond protective walls 178 on opposite sides of each filled via 170. Support beam 81 is shown with conductors 62 disposed as linear traces on the support beam 81. Conductors 62 are also shown as traces leading to the poly-Si filled vias 170 along the top edge as shown in the enlarged portion of FIG. 28.

Figure 29:
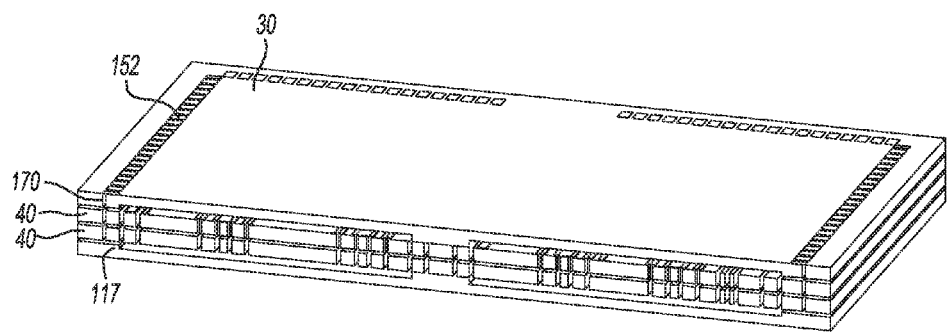
FIG. 29 is a semi-schematic cutaway perspective view depicting an example of a TIMU according to the present disclosure.

FIG. 29 is a semi-schematic cutaway perspective view depicting an example of a TIMU according to the present disclosure. An edge has been cut away vertically to reveal surface 117. Poly-Si filled vias 170 are depicted connecting the MEMS device layers 40 to external conductor pads 152 on the cap layer 30.

Figure 30:
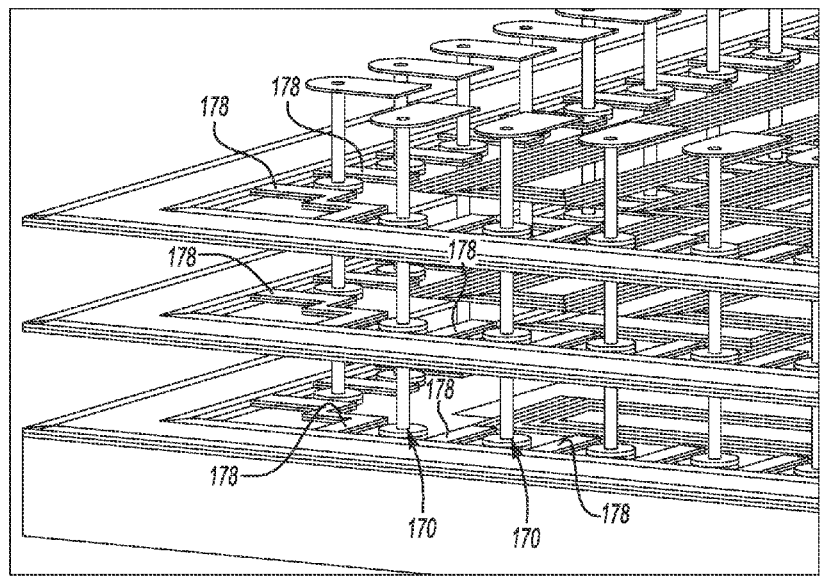
FIG. 30 is a semi-schematic perspective view depicting a portion of conductive elements in an example of a TIMU according to the present disclosure.

FIG. 30 is a semi-schematic perspective view depicting a portion of conductive elements in an example of a TIMU according to the present disclosure. Solder reflow protective bonds 178 are shown on opposite sides of each filled poly-Si filled via 170.

Figure 31:
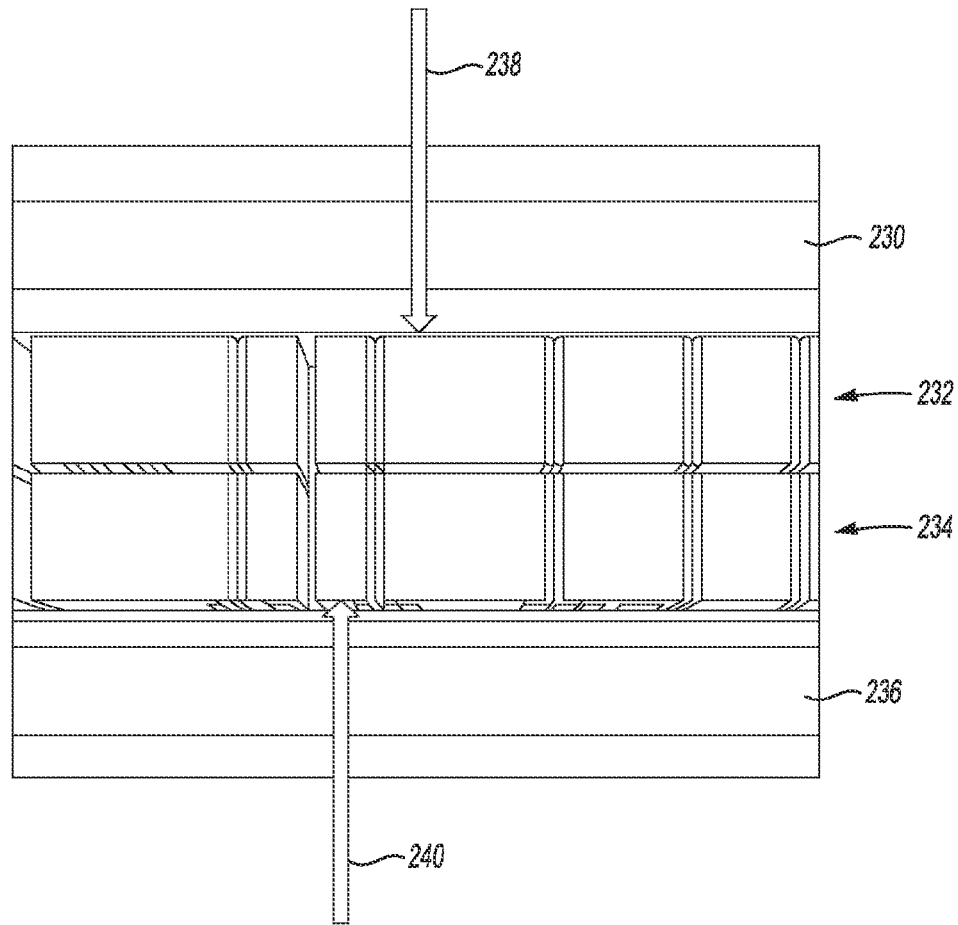
FIG. 31 is a semi-schematic side cross-sectional view depicting an example of laser trimming in a process for fabricating a microsystem according to the present disclosure.

FIG. 31 is a semi-schematic side cross-sectional view depicting an example of laser trimming in a process for fabricating a microsystem according to the present disclosure. In this example, a top glass cap 230 is shown adjacent to a first device layer 232. A second device layer 234 is adjacent to the first device layer 232, distal to the top glass layer 230. A bottom glass cap 236 is adjacent to the second device layer 236, distal to the first device layer 232. A light beam 238, e.g., a laser light beam, is shown laser trimming a device in the first device layer 232 through the top glass cap 230. Similarly, a light beam 240 is shown laser trimming a device in the second device layer 234 through the bottom glass cap 236. It is to be understood that the caps 230, 236 are optically transmissive for the light wavelength of the light beam 238, 240.

Figure 32A:
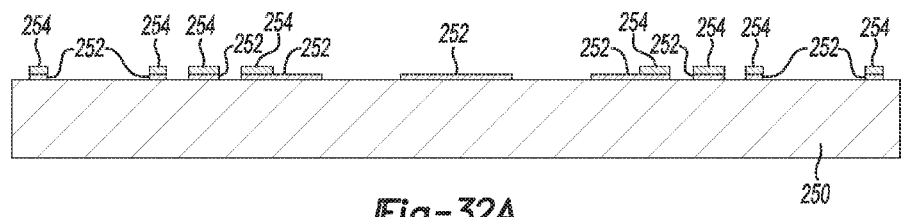
FIGS. 32A-32G are semi-schematic side cross-sectional views depicting examples of steps in a process for fabricating a microsystem according to the present disclosure.
Figure 32B:
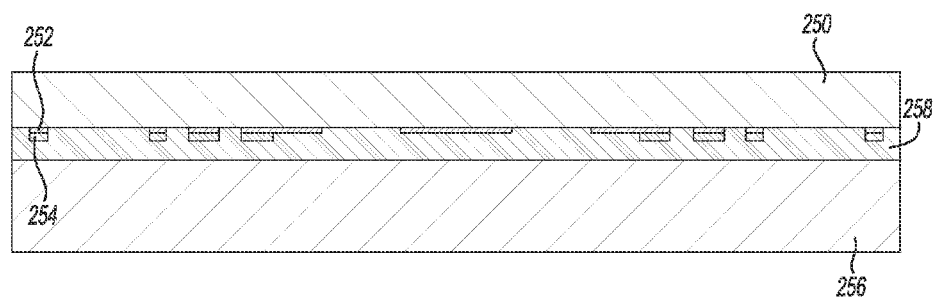

FIGS. 32A-32G are semi-schematic side cross-sectional views depicting examples of steps in a process for fabricating a microsystem according to the present disclosure. With reference to FIG. 32A, the process includes establishing a first fused silica substrate 250. The first fused silica substrate 250 may be about 200 micrometers thick. The first fused silica substrate may have recesses etched in one or both of its surfaces, i.e. it may not be planar (not shown). The process further includes patterning a thin metal 252 to dispose a first electrode and conductor on the fused silica substrate 250. The process still further includes patterning a thick metal 254 to dispose a first thermal compression bonding layer on the thin metal 252. With reference to FIG. 32B, the process includes establishing a second fused silica substrate 256. The second fused silica substrate may be about 500 micrometers thick. The process further includes bonding the first fused silica substrate 250 to the second fused silica substrate 256. It is to be understood that the first thermal compression bonding layer and a mounting layer are between the first fused silica substrate 250 and the second fused silica substrate 256 as represented by reference numeral 258. The first fused silica substrate 250 may be ground to about 50 micrometers thick.

Figure 32C:
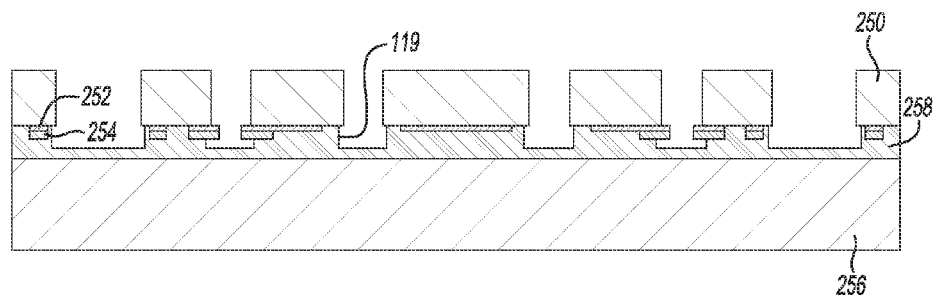
Figure 32D:
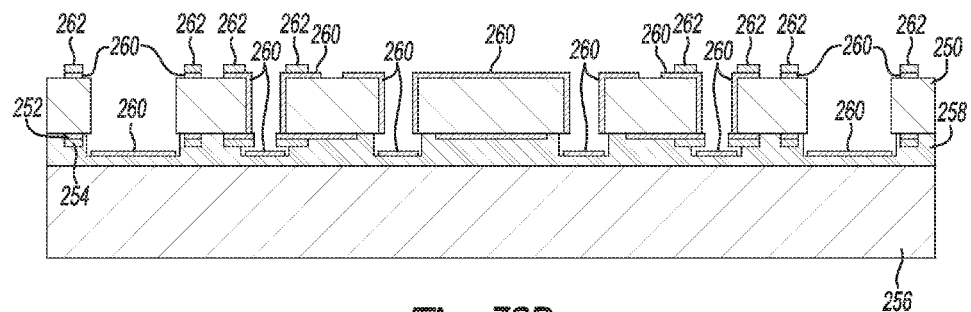

With reference to FIG. 32C, the process includes applying deep reactive-ion etching (DRIE) to pattern the first fused silica substrate and form an undercut 119 in the mounting layer 258. As represented by FIG. 32D, the process further includes patterning sputtered metal 260 to dispose a second electrode and conductor on the first fused silica substrate 250 and on a portion of the mounting layer 258. The process still further includes depositing a second thick metal 262 on the second electrode and conductor to dispose a second thermal compression bonding layer.

Figure 32E:
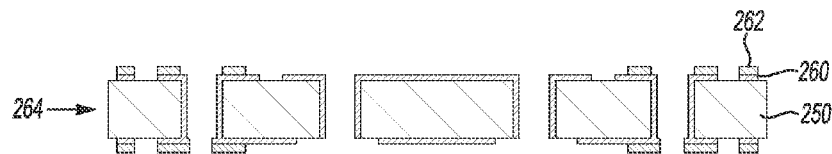
Figure 32F:
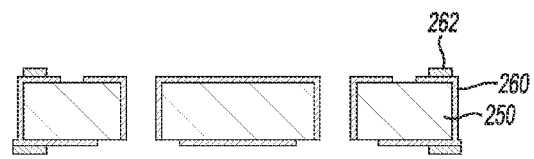

In one example according to this process indicated by FIG. 32E, the process further includes releasing a microelectromechanical system (MEMS) device layer 264 from the mounting layer 258, cleaning the MEMS device layer 264 using solvent, and baking the MEMS device layer to evaporate solvent from the MEMS device layer 264. In another example according to this process indicated by FIG. 32F, the process further includes dicing a plurality of MEMS devices on the second fused silica substrate 256 to separate the plurality of MEMS devices. It is to be understood that the dicing process (not shown) may include separating a plurality of devices from the second fused silica substrate into individual MEMS devices.

Figure 32G:
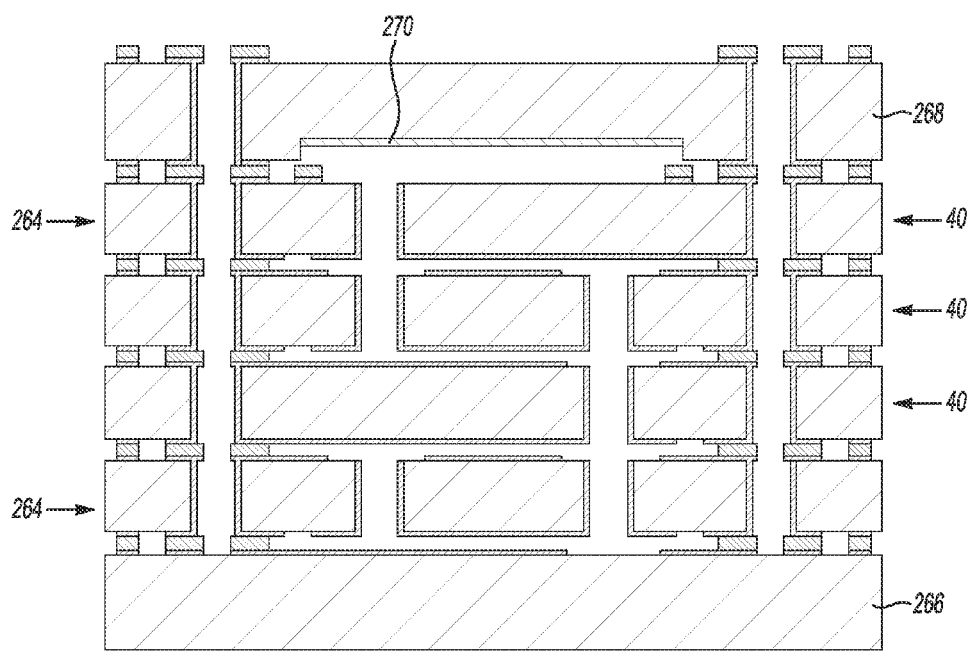

With reference to FIG. 32G, the process further includes establishing a bottom cap 266, stacking a MEMS device layer 264 on the bottom cap 266, stacking a top cap 268 on the MEMS device layer 264, and applying pressure and heat to create a thermal compression bond between the bottom cap 266, the MEMS device layer 264; and the top cap 268. As shown, example microsystems may include multiple device layers for various purposes, indicated generically by reference numeral 40. Further, in this example, a getter 270 is included in the cap layer 268.

It is to be understood use of the words "a" and "an" and other singular referents may include plural as well, both in the specification and claims, unless the context clearly indicates otherwise.

It is to be understood that the ranges provided herein include the stated range and any value or sub-range within the stated range. For example, a range from about 1 kHz to about 3 kHz should be interpreted to include not only the explicitly recited limits of about 1 kHz to about 3 kHz, but also to include individual values, such as 1500 Hz, 2000 Hz, 2500 Hz, etc., and sub-ranges, such as from about 1000 Hz to about 2100 Hz, from about 1800 Hz to about 1950 Hz, etc. Furthermore, when "about" is utilized to describe a value, this is meant to encompass minor variations (up to +/−10%) from the stated value.

It is to be understood that the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

While several examples have been described in detail, it will be apparent to those skilled in the art that the disclosed examples may be modified. Therefore, the foregoing description is to be considered non-limiting.

What is claimed is:
1. A microsystem, comprising:
a package base layer formed from a first substrate of an electrical insulating material, the package base layer having:
  a base inner surface defining a base cavity; and
  a base external surface opposed to the base inner surface, and in direct communication with an environment;
a cap layer formed from a second substrate of the electrical insulating material or of an other electrical insulating material, the cap layer having:
  a cap inner surface defining a cap cavity; and
  a cap external surface opposed to the cap inner surface, and in direct communication with the environment; and
a plurality of microelectromechanical (MEMS) device layers, each of the MEMS device layers in the plurality of MEMS device layers having a respective device layer substrate disposed between the package base layer and the cap layer, wherein respective adjacent portions of the package base layer, the cap layer and the respective device layer substrates are bonded to define an enclosed space between the package base layer and the cap layer, the enclosed space at least partially including the base cavity or the cap cavity;

wherein a space between the cap cavity and the base cavity defines an operative portion of each of the MEMS device layers in the plurality of MEMS device layers;

wherein at least an operative portion of a respective MEMS device on or in each of the MEMS device layers in the plurality of MEMS device layers is disposed in the enclosed space;

wherein each of the MEMS device layers in the plurality of MEMS device layers is formed from a respective substrate of the electrical insulating material or of the other electrical insulating material;

wherein at least one of the MEMS device layers in the plurality of MEMS device layers is formed from the respective substrate of the electrical insulating material and an other of the MEMS device layers in the plurality of MEMS device layers is formed from the respective substrate of the other electrical insulating material; and wherein the electrical insulating material and the other electrical insulating material are each independently chosen from fused silica, fused quartz, glass, ceramic, zero expansion glass-ceramic, mica, alumina, sapphire, and quartz.

2. The microsystem as defined in claim 1, further comprising:
an additional MEMS device layer disposed between the package base layer and the cap layer, wherein the additional MEMS device layer is formed from silicon, silicon-on-insulator, silicon dioxide, germanium, silicon carbide, silicon carbon, graphite, graphene, gallium arsenide, gallium nitride, gallium phosphide, indium phosphide, zinc oxide, zinc sulfide, zinc selenide, lead zirconium titanate, cadmium selenide, cadmium telluride, cadmium mercury telluride, lithium niobate, semiconductors, piezoelectrics, magnetics, ferroelectrics, graphite, lithium tantalite, yttrium aluminum garnet (YAG), magnesium oxide, magnesium fluoride, lithium fluoride, barium fluoride, barium titanate, strontium titanate, metals, fused silica, fused quartz, glass, ceramic, zero expansion glass-ceramic, mica, alumina, sapphire, and quartz or combinations thereof.

3. The microsystem as defined in claim 1 wherein at least a portion of each of the MEMS device layers in the plurality of the MEMS device layers is unsupported by the respective MEMS device layer substrate.

4. The microsystem as defined in claim 1 wherein at least one of the MEMS device layers in the plurality of the MEMS device layers includes two MEMS device layers, each being formed from different substrate materials.

5. The microsystem as defined in claim 1, further comprising:
a feedthrough via formed in the respective adjacent stacked portions of the package base layer, at least one of the MEMS device layers in the plurality of the MEMS device layers; or the cap layer; and
an electrical conductor disposed in the feedthrough via to allow electrical communication through the electrical insulating material or the other electrical insulating material with the respective MEMS device on or in the at least one of the MEMS device layers in the plurality of the MEMS device layers in the enclosed space.

6. The microsystem as defined in claim 1, further comprising an operative material deposited on at least a portion of at least one of the MEMS device layers in the plurality of the MEMS device layers, the base inner surface, the cap inner surface, or combinations thereof to serve a gettering function or to operatively perform as a portion of the microsystem.

7. The microsystem as defined in claim 1 wherein at least one of the MEMS devices is chosen from mechanical isolators, thermal isolators, shock absorbers, and combinations thereof.

8. The microsystem as defined in claim 1 wherein the package base layer or the cap layer further includes at least one device chosen from sensors, actuators, mechanical isolators, thermal isolators, shock absorbers, and combinations thereof.

9. The microsystem as defined in claim 1 wherein at least the operative portion of one of the MEMS device layers in the plurality of the MEMS device layers is mechanically connected in the enclosed space between the base cavity and the cap cavity to at least an other operative portion of an adjacent MEMS device layer in the plurality of the MEMS device layers.

10. The microsystem as defined in claim 1 wherein at least the operative portion of one of the MEMS device layers in the plurality of the MEMS device layers is mechanically connected in the enclosed space between the base cavity and the cap cavity to at least an other operative portion of the package base layer or the cap layer.

11. The microsystem as defined in claim 1 wherein at least the operative portion of one of the MEMS device layers in the plurality of the MEMS device layers is mechanically isolated from at least an other operative portion of an adjacent MEMS device layer in the plurality of the MEMS device layers.

12. The microsystem as defined in claim 1 wherein an active device, capacitive element, or inductive element is attached to or integrated with the package base layer, or the cap layer.

13. The microsystem as defined in claim 12 wherein the active device is flip chip bonded to the package base layer or the cap layer.

14. The microsystem as defined in claim 12 wherein the active device communicates optically through the package base layer, the cap layer, a partition layer or at least one of the MEMS device layers in the plurality of the MEMS device layers.

15. The microsystem as defined in claim 1 wherein at least the operative portion of at least one of the plurality of the MEMS devices is formed in the respective device layer substrate of the respective MEMS device layer by micromachining.

16. The microsystem as defined in claim 1, further comprising:
a partition layer formed from a third substrate of the electrical insulating material, the partition layer having a first surface defining a first cavity and a second surface opposite the first surface defining a second cavity wherein the partition layer divides the enclosed space into at least two hydraulically separated enclosed spaces.

17. The microsystem as defined in claim 1 wherein at least one of the plurality of the MEMS devices communicates optically through the package base layer, the cap layer, a partition layer or at least one of the MEMS device layers in the plurality of the MEMS device layers.

18. The microsystem as defined in claim 1 wherein the package base layer, the cap layer, a partition layer and each of the MEMS device layers in the plurality of the MEMS device layers are electrically isolated from each other.

19. The microsystem as defined in claim 1 wherein the at least one of the MEMS device layers of the plurality of MEMS device layers includes:
a thermal-and-vibration-isolating platform;
a clock resonator disposed on the thermal-and-vibration-isolating platform;
an accelerometer disposed on the thermal-and-vibration-isolating platform;
and a gyroscope disposed on an other thermal-and-vibration-isolating platform.

20. The microsystem as defined in claim 19 wherein the gyroscope is a ring gyroscope or tuning fork gyroscope.

21. The microsystem as defined in claim 19 wherein the accelerometer is a double-ended tuning fork (DETF) resonant accelerometer a clamp-clamp beam resonant accelerometer, a vertically-hinged resonant accelerometer, or an electrostatic non-resonant accelerometer.

22. The microsystem as defined in claim 19 wherein the cap layer and the package base layer each include sensors, actuators, mechanical isolators, thermal isolators, shock absorbers, conductive layers, getters, transparent areas for optical access, or radiation shields.

23. The microsystem as defined in claim 2 wherein the additional MEMS device layer includes:
a thermal-and-vibration-isolating platform;
a clock resonator disposed on the thermal-and-vibration-isolating platform;
an accelerometer disposed on the thermal-and-vibration-isolating platform;
and a gyroscope disposed on an other thermal-and-vibration-isolating platform.

24. The microsystem as defined in claim 23 wherein the gyroscope is a ring gyroscope or a tuning fork gyroscope.

25. The microsystem as defined in claim 23 wherein the accelerometer is a double-ended tuning fork (DETF) resonant accelerometer, a clamp-clamp beam resonant accelerometer, a vertically-hinged resonant accelerometer, or an electrostatic non-resonant accelerometer.

26. The microsystem as defined in claim 23 wherein the cap layer and the package base layer each include a sensor, an actuator, a mechanical isolator, a thermal isolator, a shock absorber, a conductive layer, a getter, a transparent area for optical access, or a radiation shield disposed thereon.

27. A microsystem, comprising:
a package base layer formed from a first substrate of an electrical insulating material, the package base layer having:
a base inner surface defining a base cavity; and
a base external surface opposed to the base inner surface, and in direct communication with an environment;
a cap layer formed from a second substrate of the electrical insulating material or of an other electrical insulating material, the cap layer having:
a cap inner surface defining a cap cavity; and
a cap external surface opposed to the cap inner surface, and in direct communication with the environment; and
a microelectromechanical (MEMS) device layer having a device layer substrate disposed between the package base layer and the cap layer, wherein respective adjacent portions of the package base layer, the cap layer and the device layer substrate are bonded to define an enclosed space between the package base layer and the cap layer, the enclosed space at least partially including the base cavity or the cap cavity;
wherein at least an operative portion of a MEMS device on or in the MEMS device layer is disposed in the enclosed space;
wherein the MEMS device layer is formed from a substrate of the electrical insulating material or of the other electrical insulating material; wherein the electrical insulating material and the other electrical insulating material are each independently chosen from fused silica, fused quartz, glass, ceramic, zero expansion glass-ceramic, mica, alumina, sapphire, and quartz; and
wherein the package base layer or the cap layer further includes at least one device chosen from sensors, actuators, mechanical isolators, thermal isolators, shock absorbers, and combinations thereof.

28. The microsystem as defined in claim 1 wherein an active device, capacitive element, or inductive element is attached to or integrated with at least one of the MEMS device layers in the plurality of the MEMS device layers.

29. The microsystem as defined in claim 28 wherein the active device is flip chip bonded to the at least one of the MEMS device layers in the plurality of the MEMS device layers.

30. A microsystem, comprising:
a package base layer formed from a first substrate of an electrical insulating material, the package base layer having:
a base inner surface defining a base cavity; and
a base external surface opposed to the base inner surface, and in direct communication with an environment;
a cap layer formed from a second substrate of the electrical insulating material or of an other electrical insulating material, the cap layer having:
a cap inner surface defining a cap cavity; and
a cap external surface opposed to the cap inner surface, and in direct communication with the environment; and
a microelectromechanical (MEMS) device layer having a device layer substrate disposed between the package base layer and the cap layer, wherein respective adjacent portions of the package base layer, the cap layer and the device layer substrate are bonded to define an enclosed space between the package base layer and the cap layer, the enclosed space at least partially including the base cavity or the cap cavity;
wherein at least an operative portion of a MEMS device on or in the MEMS device layer is disposed in the enclosed space;
wherein the MEMS device layer is formed from a substrate of the electrical insulating material or of the other electrical insulating material;
wherein the package base layer, the cap layer, a partition layer and the MEMS device layer are electrically isolated from each other;
wherein the partition layer is formed from a third substrate of the electrical insulating material;
wherein the partition layer has a first surface defining a first cavity and a second surface opposite the first surface defining a second cavity;
wherein the partition layer divides the enclosed space into at least two hydraulically separated enclosed spaces; and
wherein the electrical insulating material and the other electrical insulating material are each independently chosen from fused silica, fused quartz, glass, ceramic, zero expansion glass-ceramic, mica, alumina, sapphire, and quartz.

31. A microsystem, comprising:
a package base layer formed from a first substrate of an electrical insulating material, the package base layer having:
  a base inner surface defining a base cavity; and
  a base external surface opposed to the base inner surface, and in direct communication with an environment;
a cap layer formed from a second substrate of the electrical insulating material or of an other electrical insulating material, the cap layer having:
  a cap inner surface defining a cap cavity; and
  a cap external surface opposed to the cap inner surface, and in direct communication with the environment; and
a microelectromechanical (MEMS) device layer having a device layer substrate disposed between the package base layer and the cap layer, wherein respective adjacent portions of the package base layer, the cap layer and the device layer substrate are bonded to define an enclosed space between the package base layer and the cap layer, the enclosed space at least partially including the base cavity or the cap cavity;
wherein a space between the cap cavity and the base cavity defines an operative portion of the MEMS device layer;
wherein at least an operative portion of a MEMS device on or in the MEMS device layer is disposed in the enclosed space;
wherein the MEMS device layer is formed from a substrate of the electrical insulating material or of the other electrical insulating material;
wherein at least the operative portion of the MEMS device layer is mechanically connected in the enclosed space between the base cavity and the cap cavity to at least an other operative portion of the package base layer or the cap layer; and
wherein the electrical insulating material and the other electrical insulating material are each independently chosen from fused silica, fused quartz, glass, ceramic, zero expansion glass-ceramic, mica, alumina, sapphire, and quartz.

* * * * *